(12) United States Patent
Downie et al.

(10) Patent No.: US 9,652,709 B2
(45) Date of Patent: *May 16, 2017

(54) COMMUNICATIONS BETWEEN MULTIPLE RADIO FREQUENCY IDENTIFICATION (RFID) CONNECTED TAGS AND ONE OR MORE DEVICES, AND RELATED SYSTEMS AND METHODS

(75) Inventors: John David Downie, Painted Post, NY (US); James Scott Sutherland, Corning, NY (US); Richard Edward Wagner, Painted Post, NY (US); Dale Alan Webb, Corning, NY (US); Matthew Scott Whiting, Lawrenceville, PA (US)

(73) Assignee: Fiber Mountain, Inc., Cheshire, CT (US)

( * ) Notice: Subject to any disclaimer, the term of this patent is extended or adjusted under 35 U.S.C. 154(b) by 594 days.

This patent is subject to a terminal disclaimer.

(21) Appl. No.: 13/363,890

(22) Filed: Feb. 1, 2012

(65) Prior Publication Data

US 2012/0133490 A1 May 31, 2012

Related U.S. Application Data

(63) Continuation-in-part of application No. 11/590,377, filed on Oct. 31, 2006, now Pat. No. 8,421,626, and
(Continued)

(51) Int. Cl.
*G08B 13/14* (2006.01)
*G06K 19/077* (2006.01)
(Continued)

(52) U.S. Cl.
CPC ... *G06K 19/07749* (2013.01); *G06K 19/0717* (2013.01); *H01R 13/465* (2013.01)

(58) Field of Classification Search
CPC .. G06K 19/067; G06K 19/07; G06K 19/0701; G06K 19/0702; G06K 19/0707;
(Continued)

(56) References Cited

U.S. PATENT DOCUMENTS 3,781,862 A 12/1973 Yamamura
4,520,348 A 5/1985 Swanson
(Continued)

FOREIGN PATENT DOCUMENTS

DE 19841738 3/2000
DE 10249414 5/2004
(Continued)

OTHER PUBLICATIONS

International Search Report and Written Opinion for PCT/US2013/023971 mailed May 2, 2013, 9 pages.
(Continued)

*Primary Examiner* — Ryan Sherwin
(74) *Attorney, Agent, or Firm* — Wissing Miller LLP

(57) ABSTRACT

Protocols, systems, and methods are disclosed for two or more RFID tags to communicate with each other and a device using direct connections. A disclosed system includes a first RFID tag, a second RFID tag, and a device. The first and second RFID tags are configured to mate to each other and directly exchange information. The second RFID tag is further configured to directly exchange information with the device such that information received directly at the second RFID tag from the first RFID tag may then be directly exchanged with the device. The first RFID tag may send a first tag identification directly from the first RFID tag to the second RFID tag. The second RFID tag may then send a first acknowledgement to the first RFID tag if the first tag identification was correctly received by the second RFID tag.

31 Claims, 20 Drawing Sheets

Related U.S. Application Data a continuation-in-part of application No. 12/415,343, filed on Mar. 31, 2009, now Pat. No. 8,264,366.

(51) Int. Cl.
*G06K 19/07* (2006.01)
*H01R 13/46* (2006.01)

(58) Field of Classification Search
CPC ........... G06K 19/0708; G06K 19/0709; G06K 19/0723; G06K 19/0724; G06K 19/0725; G06K 19/077; G06K 19/07749; H04B 5/0056; H04B 5/0062; H04B 5/0068; H04W 4/008; H04W 84/00; H04W 84/18
USPC ..................... 340/572.1–572.9, 10.1–10.6
See application file for complete search history.

(56) References Cited

U.S. PATENT DOCUMENTS

| | | |
|---|---|---|
| 4,889,977 A | 12/1989 | Haydon |
| 5,260,694 A | 11/1993 | Remahl |
| 5,381,137 A | 1/1995 | Ghaem et al. |
| 5,398,932 A | 3/1995 | Eberhardt et al. |
| 5,483,467 A | 1/1996 | Krupka et al. |
| 5,528,222 A | 6/1996 | Moskowitz et al. |
| 5,602,538 A | 2/1997 | Orthmann et al. |
| 5,640,151 A | 6/1997 | Reis et al. |
| 5,661,470 A | 8/1997 | Karr |
| 5,798,711 A | 8/1998 | Issa et al. |
| 5,821,510 A | 10/1998 | Cohen et al. |
| 5,910,776 A | 6/1999 | Black |
| 5,914,862 A | 6/1999 | Ferguson et al. |
| 5,995,006 A | 11/1999 | Walsh |
| 6,002,331 A | 12/1999 | Laor |
| 6,025,725 A | 2/2000 | Gershenfeld et al. |
| 6,100,804 A | 8/2000 | Brady et al. |
| 6,118,379 A | 9/2000 | Kodukula et al. |
| 6,127,929 A | 10/2000 | Roz |
| 6,133,835 A | 10/2000 | De Leeuw et al. |
| 6,163,278 A | 12/2000 | Janman |
| 6,164,551 A | 12/2000 | Altwasser |
| 6,232,870 B1 | 5/2001 | Garber et al. |
| 6,275,681 B1 | 8/2001 | Vega et al. |
| 6,424,263 B1 | 7/2002 | Lee et al. |
| 6,424,315 B1 | 7/2002 | Glenn et al. |
| 6,496,113 B2 | 12/2002 | Lee et al. |
| 6,496,382 B1 | 12/2002 | Ferguson et al. |
| 6,522,308 B1 | 2/2003 | Mathieu |
| 6,618,022 B2 | 9/2003 | Harvey |
| 6,621,410 B1 * | 9/2003 | Lastinger et al. ......... 340/10.42 |
| 6,693,513 B2 | 2/2004 | Tuttle |
| 6,784,802 B1 | 8/2004 | Stanescu |
| 6,808,116 B1 | 10/2004 | Eslambolchi et al. |
| 6,829,427 B1 | 12/2004 | Becker |
| 6,847,586 B1 | 1/2005 | Chen |
| 6,847,856 B1 | 1/2005 | Bohannon |
| 6,857,897 B2 | 2/2005 | Conn |
| 6,891,471 B2 | 5/2005 | Yuen et al. |
| 6,897,374 B2 | 5/2005 | Garber et al. |
| 6,898,368 B2 | 5/2005 | Colombo et al. |
| 6,899,626 B1 | 5/2005 | Luciano et al. |
| 6,915,050 B2 | 7/2005 | Koyasu et al. |
| 6,924,997 B2 | 8/2005 | Chen et al. |
| 6,968,994 B1 | 11/2005 | Ashwood Smith |
| 6,971,895 B2 | 12/2005 | Sago et al. |
| 6,973,243 B2 | 12/2005 | Koyasu et al. |
| 6,999,028 B2 | 2/2006 | Egbert |
| 7,005,985 B1 | 2/2006 | Steeves |
| 7,014,100 B2 | 3/2006 | Zierolf |
| 7,026,936 B2 * | 4/2006 | Roesner ................... 340/572.4 |
| 7,061,366 B2 | 6/2006 | Bell et al. |
| 7,068,170 B2 | 6/2006 | Green |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,102,520 B2 | 9/2006 | Liu et al. |
| 7,151,455 B2 | 12/2006 | Lindsay et al. |
| 7,158,031 B2 | 1/2007 | Tuttle |
| 7,158,033 B2 | 1/2007 | Forster |
| 7,165,728 B2 | 1/2007 | Durrant et al. |
| 7,170,393 B2 | 1/2007 | Martin |
| 7,194,180 B2 | 3/2007 | Becker |
| 7,205,898 B2 | 4/2007 | Dixon et al. |
| 7,209,042 B2 | 4/2007 | Martin et al. |
| 7,210,858 B2 | 5/2007 | Sago et al |
| 7,221,277 B2 | 5/2007 | Caron et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,243,837 B2 | 7/2007 | Durrant et al. |
| 7,249,705 B2 | 7/2007 | Dudley |
| 7,251,570 B2 * | 7/2007 | Hancock et al. ................ 702/57 |
| 7,253,735 B2 | 8/2007 | Gengel et al. |
| 7,265,674 B2 | 9/2007 | Tuttle |
| 7,275,970 B2 | 10/2007 | Hoshina |
| 7,297,028 B2 | 11/2007 | Daikuhara et al. |
| 7,298,266 B2 | 11/2007 | Forster |
| 7,298,330 B2 | 11/2007 | Forster |
| 7,306,489 B2 | 12/2007 | Werthman et al. |
| 7,336,883 B2 | 2/2008 | Scholtz |
| 7,348,884 B2 | 3/2008 | Higham |
| 7,349,605 B2 | 3/2008 | Noonan et al. |
| 7,352,285 B2 | 4/2008 | Sakama et al. |
| 7,352,289 B1 | 4/2008 | Harris |
| 7,356,208 B2 | 4/2008 | Becker |
| 7,375,616 B2 | 5/2008 | Rowse et al. |
| 7,536,574 B2 | 5/2009 | Liu |
| 7,554,448 B2 | 6/2009 | Tomioka |
| 7,712,674 B1 | 5/2010 | Warner et al. |
| 7,802,015 B2 * | 9/2010 | Cheifot et al. ................ 709/248 |
| 7,965,186 B2 | 6/2011 | Downie et al. |
| 8,089,344 B1 * | 1/2012 | Zand ......................... 340/10.2 |
| 8,172,468 B2 | 5/2012 | Jones et al. |
| 8,179,259 B2 | 5/2012 | Bolotin et al. |
| 8,217,794 B2 | 7/2012 | Yoo et al. |
| 8,264,366 B2 | 9/2012 | Chamarti et al. |
| 8,333,518 B2 | 12/2012 | Jones et al. |
| 8,594,567 B2 | 11/2013 | Finkenzeller et al. |
| 2002/0092347 A1 | 7/2002 | Niekerk et al. |
| 2003/0021580 A1 | 1/2003 | Matthews |
| 2003/0058126 A1 | 3/2003 | Fling et al. |
| 2003/0061393 A1 | 3/2003 | Steegmans et al. |
| 2003/0179073 A1 | 9/2003 | Ghazarian |
| 2004/0041714 A1 | 3/2004 | Forster |
| 2004/0114879 A1 | 6/2004 | Hiereth et al. |
| 2004/0117515 A1 | 6/2004 | Sago et al. |
| 2004/0149736 A1 | 8/2004 | Clothier |
| 2004/0189263 A1 | 9/2004 | Meier et al. |
| 2004/0253874 A1 | 12/2004 | Plishner |
| 2005/0021425 A1 * | 1/2005 | Casey ......................... 705/28 |
| 2005/0052287 A1 | 3/2005 | Whitesmith et al. |
| 2005/0068156 A1 | 3/2005 | Chuang et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0130656 A1 * | 6/2005 | Chen ......................... 455/436 |
| 2005/0170784 A1 | 8/2005 | Ariyoshi et al. |
| 2005/0201450 A1 | 9/2005 | Volpi et al. |
| 2005/0215119 A1 | 9/2005 | Kaneko |
| 2005/0224585 A1 | 10/2005 | Durrant et al. |
| 2005/0232636 A1 | 10/2005 | Durrant et al. |
| 2005/0242950 A1 | 11/2005 | Lindsay et al. |
| 2005/0259930 A1 * | 11/2005 | Elkins et al. .................. 385/100 |
| 2005/0284358 A1 * | 12/2005 | Laackmann .................. 116/216 |
| 2005/0285718 A1 | 12/2005 | Enguent |
| 2006/0006234 A1 | 1/2006 | Mizutani et al. |
| 2006/0006999 A1 | 1/2006 | Walczyk et al. |
| 2006/0015233 A1 | 1/2006 | Olsen, III et al. |
| 2006/0019540 A1 | 1/2006 | Werthman et al. |
| 2006/0026316 A1 | 2/2006 | Milenkovic et al. |
| 2006/0044148 A1 | 3/2006 | Daniels et al. |

(56) References Cited

U.S. PATENT DOCUMENTS

| | | |
|---|---|---|
| 2006/0139149 A1 | 6/2006 | Faro et al. |
| 2006/0145863 A1 | 7/2006 | Martin et al. |
| 2006/0148279 A1 | 7/2006 | German et al. |
| 2006/0166546 A1 | 7/2006 | Ashizawa et al. |
| 2006/0232419 A1 | 10/2006 | Tomioka et al. |
| 2006/0233506 A1 | 10/2006 | Noonan et al. |
| 2006/0267737 A1 | 11/2006 | Colby |
| 2006/0267778 A1 | 11/2006 | Gengel et al. |
| 2007/0001807 A1 | 1/2007 | Malone et al. |
| 2007/0018787 A1 | 1/2007 | Martinez de Velasco Cortina et al. |
| 2007/0023525 A1 | 2/2007 | Son et al. |
| 2007/0057771 A1 | 3/2007 | Tomioka |
| 2007/0080783 A1* | 4/2007 | Ghosh et al. ............... 340/10.1 |
| 2007/0120684 A1 | 5/2007 | Utaka et al. |
| 2007/0152828 A1 | 7/2007 | Mohalik |
| 2007/0200682 A1 | 8/2007 | Colby |
| 2007/0205897 A1 | 9/2007 | Forster |
| 2007/0205902 A1 | 9/2007 | Cote et al. |
| 2007/0210923 A1* | 9/2007 | Butler et al. ............... 340/572.8 |
| 2007/0216534 A1 | 9/2007 | Ferguson et al. |
| 2007/0236355 A1 | 10/2007 | Flaster et al. |
| 2007/0247284 A1 | 10/2007 | Martin et al. |
| 2007/0273507 A1 | 11/2007 | Burchell et al. |
| 2008/0030353 A1 | 2/2008 | O'Toole et al. |
| 2008/0048826 A1 | 2/2008 | Agrawal et al. |
| 2008/0100440 A1 | 5/2008 | Downie et al. |
| 2008/0100456 A1 | 5/2008 | Downie et al. |
| 2008/0100467 A1 | 5/2008 | Downie et al. |
| 2008/0122641 A1 | 5/2008 | Amidi |
| 2008/0166094 A1 | 7/2008 | Bookbinder et al. |
| 2008/0186136 A1 | 8/2008 | Raphaeli et al. |
| 2008/0240724 A1 | 10/2008 | Aguren |
| 2008/0252424 A1 | 10/2008 | Maltseff et al. |
| 2009/0088077 A1 | 4/2009 | Brown et al. |
| 2009/0169163 A1 | 7/2009 | Abbott, III et al. |
| 2010/0019883 A1 | 1/2010 | Eom et al. |
| 2010/0134293 A1 | 6/2010 | Fujishiro et al. |
| 2010/0245057 A1 | 9/2010 | Chamarti et al. |
| 2011/0050165 A1 | 3/2011 | Sato et al. |
| 2011/0147468 A1 | 6/2011 | Park et al. |
| 2011/0266338 A1 | 11/2011 | Babcock et al. |
| 2011/0267194 A1 | 11/2011 | Hong et al. |

FOREIGN PATENT DOCUMENTS

| | | |
|---|---|---|
| EP | 0593131 A1 | 4/1994 |
| EP | 1455550 | 3/2004 |
| GB | 2371211 | 7/2002 |
| JP | 03-242795 | 10/1991 |
| JP | 2002-264617 | 9/2002 |
| JP | 2003-148653 | 5/2003 |
| JP | 2003-172827 | 6/2003 |
| JP | 2003-229215 | 8/2003 |
| JP | 2004-039389 | 2/2004 |
| JP | 2004-142500 | 5/2004 |
| JP | 2004-152543 | 5/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-033857 | 2/2005 |
| JP | 2005-050581 | 2/2005 |
| JP | 2005-084162 | 3/2005 |
| JP | 2005-086901 | 3/2005 |
| JP | 2005-087135 | 4/2005 |
| JP | 2005-092107 | 4/2005 |
| JP | 2005-134125 | 5/2005 |
| JP | 2005-216698 | 8/2005 |
| JP | 2005-302403 | 10/2005 |
| JP | 2005-315980 | 11/2005 |
| JP | 2005-339983 | 12/2005 |
| JP | 2006-054118 | 2/2006 |
| JP | 2006-245983 | 9/2006 |
| JP | 2006-279650 | 10/2006 |
| JP | 2006344232 A | 12/2006 |
| JP | 2007-087849 | 4/2007 |
| JP | 2007-088957 | 4/2007 |
| JP | 2007-158993 | 6/2007 |
| JP | 2007-189774 | 7/2007 |
| JP | 2007-221400 | 8/2007 |
| JP | 2011510402 A | 3/2011 |
| JP | 2011123539 A | 6/2011 |
| JP | 2012501577 A | 1/2012 |
| WO | 0106444 A1 | 1/2001 |
| WO | 01/55991 | 8/2001 |
| WO | 0297710 A1 | 5/2002 |
| WO | 03/098175 | 11/2003 |
| WO | 2004/030154 | 4/2004 |
| WO | 2004086288 A2 | 10/2004 |
| WO | 2005/069203 | 7/2005 |
| WO | 2006/058119 | 6/2006 |
| WO | 2006072840 A1 | 7/2006 |
| WO | 2007035863 A2 | 3/2007 |
| WO | 2007054932 A2 | 5/2007 |
| WO | 2007078530 A2 | 7/2007 |
| WO | 2008/000656 | 1/2008 |

OTHER PUBLICATIONS

International Search Report and Written Opinion for PCT/US2013/023975 mailed May 2, 2013, 9 pages.
International Search Report and Written Opinion for PCT/US2013/023977 mailed May 2, 2013, 9 pages.
First Chinese Office Action for patent application 200780050113 mailed Jul. 26, 2011, 3 pages.
Non-final Office Action for U.S. Appl. No. 11/638,894 mailed Jun. 2, 2009, 4 pages.
Notice of Allowance for U.S. Appl. No. 11/638,894 mailed Dec. 2, 2009, 5 pages.
Second Chinese of Office Action for patent application 200780050113 mailed Jun. 5, 2012, 5 pages.
PCT International Search Report for International Application No. PCT/US07/22896, May 9, 2008.
International Search Report and Written Opinion for PCT/US2013/063694 mailed May 28, 2014, 10 pages.
Non-final Office Action for U.S. Appl. No. 13/363,808 mailed Sep. 8, 2014, 33 pages.
Non-final Office Action for U.S. Appl. No. 13/363,851 mailed Sep. 5, 2014, 19 pages.
International Search Report and Written Opinion for PCT/US2014/026101 mailed Jul. 10, 2014, 9 pages.
Non-final Office Action for U.S. Appl. No. 13/837,074 mailed Nov. 10, 2014, 25 pages.
Non-final Office Action for U.S. Appl. No. 13/836,342 mailed Jan. 16, 2015, 10 pages.
Advisory Action for U.S. Appl. No. 13/837,074 mailed Aug. 14, 2015, 3 pages.
Advisory Action for U.S. Appl. No. 13/837,074 mailed Sep. 21, 2015, 3 pages.
Non-final Office Action for U.S. Appl. No. 13/363,808 mailed Oct. 6, 2015, 36 pages.
Advisory Action for U.S. Appl. No. 13/836,342 mailed Oct. 28, 2015, 3 pages.
Non-final Office Action for U.S. Appl. No. 13/363,851 mailed Oct. 6, 2015, 21 pages.
Final Office Action for U.S. Appl. No. 13/837,074 mailed Jun. 5, 2015, 26 pages.
Advisory Action for U.S. Appl. No. 13/363,808 mailed Jun. 10, 2015, 3 pages.
Final Office Action for U.S. Appl. No. 13/836,342 mailed May 21, 2015, 11 pages.
Written Opinion for PCT/US2014/026101 mailed Feb. 16, 2015, 4 pages.

(56) References Cited

OTHER PUBLICATIONS

International Preliminary Report on Patentability for PCT/US2013/063694 mailed Apr. 16, 2015, 8 pages.
International Preliminary Report on Patentability for PCT/US2014/026101 mailed May 22, 2015, 6 pages.
Final Office Action for U.S. Appl. No. 13/363,808 mailed Feb. 20, 2015, 37 pages.
Final Office Action for U.S. Appl. No. 13/363,851 mailed Feb. 20, 2015, 22 pages.
Final Office Action for U.S. Appl. No. 13/837,074 mailed Dec. 14, 2015, 29 pages.
Advisory Action for U.S. Appl. No. 13/837,074 mailed Feb. 12, 2016, 3 pages.
Non-final Office Action for U.S. Appl. No. 13/837,074 mailed Apr. 21, 2016, 30 pages.
Final Office Action for U.S. Appl. No. 13/363,808 mailed Apr. 14, 2016, 39 pages.
Notice of Allowance for U.S. Appl. No. 13/836,342 mailed Jun. 6, 2016, 9 pages.
Final Office Action for U.S. Appl. No. 13/363,851 mailed Apr. 14, 2016, 25 pages.
Final Office Action for U.S. Appl. No. 13/837,074, mailed Sep. 8, 2016, 30 pages.
Notice of Allowance and Examiner-Initiated Interview Summary for U.S. Appl. No. 13/363,808, mailed Aug. 26, 2016, 10 pages.
Notice of Allowance for U.S. Appl. No. 13/836,342, mailed Sep. 27, 2016, 9 pages.
Notice of Allowance and Examiner-Initiated Interview Summary for U.S. Appl. No. 13/363,851, mailed Aug. 25, 2016, 11 pages.
Examination Report for European Patent Application No. 14723547.7, mailed Sep. 27, 2016, 9 pages.
Notice of Grounds for Rejection for Japanese Patent Application No. 2014-555682, issued Sep. 6, 2016, 6 pages.
Notice of Grounds for Rejection for Japanese Patent Application No. 2014-555685, issued Aug. 30, 2016, 7 pages.
Notice of Grounds for Rejection for Japanese Patent Application No. 2014-555686, issued Aug. 16, 2016, 7 pages.
Final Office Action for U.S. Appl. No. 13/837,074, mailed Dec. 15, 2016, 30 pages.

\* cited by examiner

COMMUNICATIONS BETWEEN MULTIPLE RADIO FREQUENCY IDENTIFICATION (RFID) CONNECTED TAGS AND ONE OR MORE DEVICES, AND RELATED SYSTEMS AND METHODS

RELATED APPLICATIONS

This application is a continuation-in-part application of co-pending U.S. patent application Ser. No. 11/590,377 filed Oct. 31, 2006, entitled "Radio Frequency Identification Transponder For Communicating Condition Of A Component," which is incorporated by reference herein it its entirety. The present application is also a continuation-in-part application of co-pending U.S. patent application Ser. No. 12/415,343, filed Mar. 31, 2009, entitled "Components, Systems, And Methods For Associating Sensor Data With Component Location," which is incorporated by reference herein in its entirety.

BACKGROUND

Field of the Disclosure

The technology of the disclosure is related to use of radio frequency (RF) communications, including communications involving RF identification (RFID) tags or transponders.

Technical Background

It is well known to employ radio frequency (RF) identification (RFID) transponders to identify articles of manufacture. RFID transponders are often referred to as "RFID tags." RFID tags are comprised of an antenna coupled to an integrated circuit (IC). An identification number or other characteristic is stored in the IC or memory coupled to the IC. The identification number can be provided to another system, such as an RFID reader, to provide identification information for a variety of purposes. For example, if the RFID tag is an active device, the RFID tag includes a transmitter that can transmit the identification. If the RFID tag is a passive or semi-passive device, the RFID tag does not include a transmitter. The passive or semi-passive RFID tag includes a receiver that receives a wireless RF signal from a transmitter over an antenna, also known as an interrogation signal. The passive or semi-passive RFID tag wakes up in response to receipt of the interrogation signal and can respond, including providing identification information, via backscatter modulation communications, as an example.

One application of RFID tags is in communication systems to provide information regarding communication components, such as connectors and adapters as examples. In this regard, the communication components are RFID-equipped. An RFID reader can be provided as part of an RFID system to receive stored information about the RFID-equipped communication components. The RFID reader can interrogate RFID tags disposed in communication components in the range of the RFID reader to automatically discover communication components present in the RFID system. The RFID reader may provide the identification information regarding the communication components to a host computer system. Thus, it is possible to determine when two particular communication components are connected or joined together and when the connection is separated. However, in order for the RFID reader to discover the communications components present in the RFID system and determine when two particular communication components are connected or separated, a significant number of unique queries must be performed by the RFID reader and each of these queries may involve many commands and responses between the RFID reader and the set of RFID tags.

Network equipment may be provided that is configured to support interconnections of a number of RFID-equipped communication components. A technician provides the desired interconnections to establish communications. If a technician accidentally disconnects an incorrect communication component that is RFID-equipped, the host computer system can flag an error or provide another indicator to inform the technician, but not before a communication connection is broken. The unintended disconnection may result in interruption in communication services and loss of data. Also, connecting the incorrect communication components together can also cause similar issues. An unintended connection between communication components could result in information being exchanged improperly from one party to another when such exchange is not proper or authorized.

The same results can occur for other applications in addition to communications. For example, if an RFID-equipped power connector is incorrectly disconnected, a host computer system may be able to detect the disconnection, but not before power is interrupted. If the power connector is allowing power to be supplied to a critical device, such as a medical device for example, the interruption of power could be life threatening. Another example might be a coupling in a gas or fluid delivery system where it is critical to know that a connection is made and made properly. This is true in medical applications where an incorrect connection can cause serious injury or death, in industrial applications that use various process gases or high pressure hydraulic connections, and in many other applications where two parts that are designed to be mated need to be tracked to ensure that a proper connection exists and/or to provide an indication or alarm when said connection has been broken.

SUMMARY OF THE DETAILED DESCRIPTION

Embodiments disclosed in the detailed description include physical and logical protocols, and related systems and methods, for two or more radio frequency (RF) identification (RFID) tags to communicate with each other or other devices. One or more RFID tags may communicate with another RFID tag or one or more RFID tags may communicate with one or more other devices. In one embodiment, an RFID tag may communicate with a device that emulates an RFID tag.

Protocols, systems, and methods are disclosed for two or more RFID tags to communicate with each other and a device using direct connections. A disclosed system includes a first RFID tag, a second RFID tag, and a device. The first and second RFID tags are configured to mate to each other and directly exchange information. The second RFID tag is further configured to directly exchange information with the device such that information received directly at the second RFID tag from the first RFID tag may then be directly exchanged with the device. The first RFID tag may send a first tag identification directly from the first RFID tag to the second RFID tag. The second RFID tag may then send a first acknowledgement to the first RFID tag if the first tag identification was correctly received by the second RFID tag.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Figure 1:
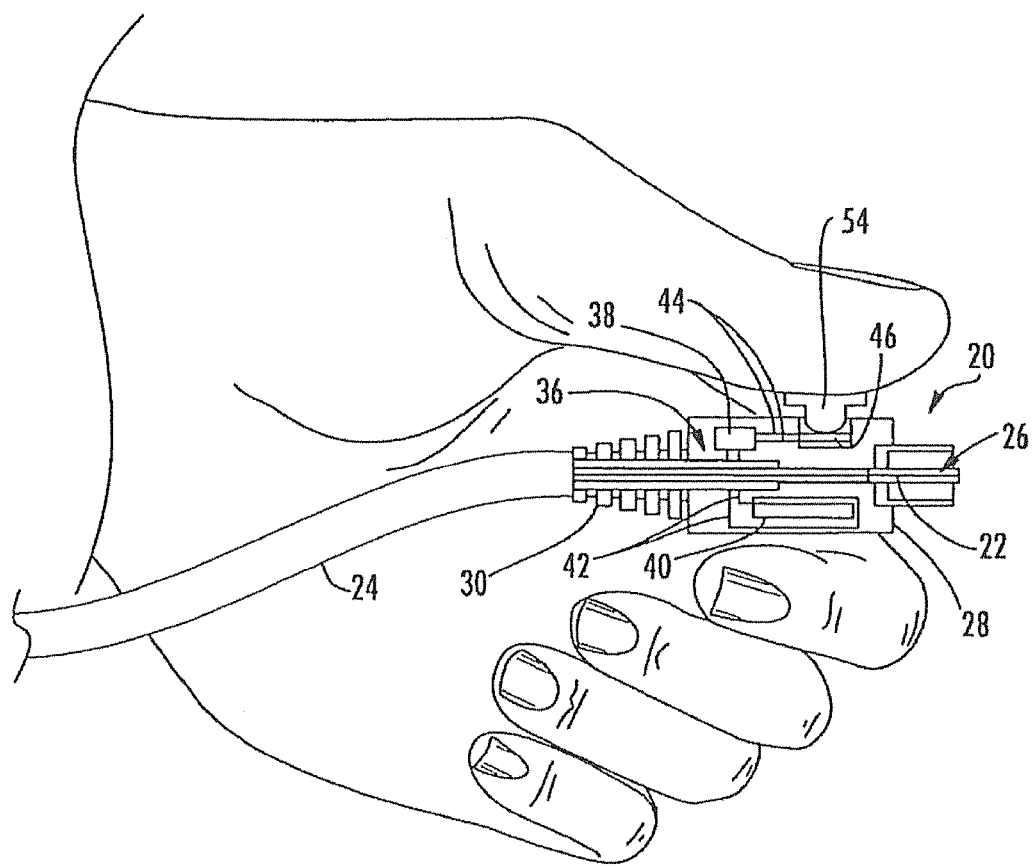
FIG. 1 is a representative schematic view of a plug according to certain embodiments including a condition responsive device operable via a push button.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include physical and logical protocols, and related systems and methods, for two or more radio frequency (RF) identification (RFID) tags to communicate with each other or other devices. One or more RFID tags may communicate with another RFID tag or one or more RFID tags may communicate with one or more other devices. In one embodiment, an RFID tag may communicate with a device that emulates an RFID tag.

Protocols, systems, and methods are disclosed for two or more RFID tags to communicate with each other and a device using direct connections. A disclosed system includes a first RFID tag, a second RFID tag, and a device. The first and second RFID tags are configured to mate to each other and directly exchange information. The second RFID tag is further configured to directly exchange information with the device such that information received directly at the second RFID tag from the first RFID tag may then be directly exchanged with the device. The first RFID tag may send a first tag identification directly from the first RFID tag to the second RFID tag. The second RFID tag may then send a first acknowledgement to the first RFID tag if the first tag identification was correctly received by the second RFID tag.

Communications between RFID tags can include using direct electrical connections in addition to standard propagated or reflected field communication via their antennas. By communicating using direct electrical connections between the RFID tags and/or devices, the amount of time it takes to determine connectivity between RFID tags is reduced as a result of not having to perform a significant number of unique queries between the RFID tags and an RFID reader, each of which may involve many commands and responses between the RFID reader and the set of RFID tags. The communication between RFID tags can occur without direct control or action on the part of the RFID reader, unlike standard RFID tags which only take action in response to a query from an RFID reader.

In one embodiment, a system is disclosed that includes a first RFID tag and a second RFID tag, wherein the first and second RFID tags are configured to mate to each other and directly exchange information. For purposes of this Specification, "directly exchanging" information between RFID tags and devices includes, but is not limited to, one-way or two-way exchange of information between the RFID tags and/or devices. In one embodiment, the information exchanged between the RFID tags may be general data. In another embodiment, the information exchanged may be identification information.

In order for the two RFID tags to directly communicate with each other, an exemplary protocol is disclosed. In one embodiment, the exemplary protocol comprises detecting that a first RFID tag of a plurality of mated RFID tags is connected to a second RFID tag of the plurality of mated RFID tags. A first message comprising a first tag identification is sent directly from the first RFID tag to the second RFID tag. The first RFID tag then receives a first acknowledgement from the second RFID tag at the first RFID tag if the first tag identification was correctly received by the second RFID tag. The protocol may further comprise the step of sending a second message comprising a second tag identification directly from the second RFID tag to the first RFID tag and receiving a second acknowledgement from the first RFID tag at the second RFID tag if the second tag identification was correctly received by the first RFID tag. The first and second RFID tags may then continue to directly communicate with each other without using the standard propagated or reflected field communication via the antennas of the RFID tags and without using an RFID reader. In one embodiment, the communication between the RFID tags is electrical. In one embodiment, one or both of the RFID tags may be passive RFID tags. If the RFID tags are passive, an RFID reader may be used to provide power to the passive RFID tags.

The embodiments of the direct tag-to-tag communications disclosed herein allow the ability to transfer multiple bits of information, as opposed to merely asserting a continuous signal. This allows the unique identification associated with each of a plurality of RFID tags to be transferred between the plurality of RFID tags. Since these tag identifications can be transferred immediately after the connection is made, the identification of the associated mated RFID tag would already be stored and available to be read by an RFID reader when it detects that a new connection has been made. Thus, the RFID reader could simply perform a direct read of the mated tag identification from the original RFID tag that was identified as having a new connection. The connectivity information of a pair of RFID tags can now be determined by identifying and reading only one connected RFID tag. This greatly reduces the amount of communications required between the RFID reader and the set of RFID tags and provides redundancy in the event that one tag of a mated pair is unable to communicate with a reader. The RFID tags disposed in two communication components can also exchange identification information when connected together to provide connection information to the RFID reader when interrogated.

For purposes of this application, the terms "mated RFID tags" and "connected RFID tags" are used interchangeably. As disclosed herein, RFID tags may also be known as RFID transponders and such terms may be used interchangeably. Additional features and advantages will be set forth in the detailed description which follows, and in part will be readily apparent to those skilled in the art from that description or recognized by practicing the embodiments as described herein, including the detailed description that follows, the claims, as well as the appended drawings.

In one embodiment, a system is disclosed that includes a first passive RFID tag and a second passive RFID tag, wherein the first and second RFID tags are configured to mate to each other and directly exchange information. In one embodiment, the information is identification information. In another embodiment, the RFID tags exchange information electrically. In order for the two RFID tags to directly communicate with each other, an exemplary protocol is disclosed. In one embodiment, the exemplary protocol comprises detecting that a first RFID tag of a plurality of mated RFID tags is connected to a second RFID tag of the plurality of mated RFID tags. A first message comprising a first tag identification is sent directly from the first RFID tag to the second RFID tag. The first RFID tag then receives a first acknowledgement from the second RFID tag at the first RFID tag if the first tag identification was correctly received by the second RFID tag. The protocol may further comprise the step of sending a second message comprising a second tag identification directly from the second RFID tag to the first RFID tag and receiving a second acknowledgement from the first RFID tag at the second RFID tag if the second tag identification was correctly received by the first RFID tag. The first and second RFID tags may then continue to directly communicate with each other without using the standard propagated or reflected field communication via the antennas of the RFID tags and without using an RFID reader. In one embodiment, one or both of the RFID tags may be passive RFID tags. If the RFID tags are passive, an RFID reader may be used to provide power to the passive RFID tags.

In one embodiment, the first and second RFID tags directly exchange identification information using a common protocol. In another embodiment, the first and second RFID tags are further configured to directly exchange identification information without using an RFID reader, other than a source of power if using passive RFID tags.

In certain embodiments, the protocols disclosed herein may be adapted to multiple (i.e., more than two) RFID tags and may be used for RFID tags in point-to-point, multipoint, daisy chain, bus, and/or star configurations. A direct tag-to-tag connection for communications using either passive or active RFID tags is disclosed. One or more RFID tags physically connected to each other or a sensor or actuator preferably have a protocol to control the exchange of data and control signals among the interconnected devices. Several aspects of the protocol are described below. Included are physical layer aspects such as connector/bus arbitration at the hardware level (tri-state devices and current and voltage mode signaling) as well as higher level logical and application layer aspects such as communication initiation and control, multiple-bit protocols, and error detection and correction methods.

The embodiments of the direct tag-to-tag communications disclosed herein allow the ability to transfer multiple bits of information, as opposed to merely asserting a continuous signal. This allows the unique identification associated with each of a plurality of RFID tags to be transferred between the plurality of RFID tags. Since these tag identifications can be transferred immediately after the connection is made, the identification of the associated mated RFID tag would already be stored and available to be read by an RFID reader when it detects that a new connection has been made. Thus, the RFID reader could simply perform a direct read of the mated tag identification from the original RFID tag that was identified as having a new connection. The connectivity information of a pair of RFID tags can now be determined by identifying and reading only one connected RFID tag. This greatly reduces the amount of communications required between the RFID reader and the set of RFID tags and provides redundancy in the case that one of the mated tags is not accessible to the RFID reader.

Also, the control and communication of devices that do not have native RF communications capability can be controlled from the RFID reader using an RFID tag with physical connections as an intermediary. Examples of such devices include, but are not limited to, light emitting diodes (LEDs); intelligent actuators (motor controllers, hydraulic controllers, piezoelectric, MEMs); intelligent sensors (pressure, temperature, flow, etc.); intelligent display devices (LCD, electroluminescent, electronic ink, etc.); or any electronic device, such as an integrated circuit (IC), a microcontroller, a microprocessor, or an electronic memory device. The electronic devices may be programmable in one embodiment. In addition, an RFID tag may be easily interfaced to other devices such as switches, LEDs, various sensors, etc., using the physical level protocols described herein.

By employing the disclosed protocols and related systems and methods, as set forth in more detail below in the detailed description and accompanying Figures, the RFID tag-to-tag connectivity can be determined without the need to burden the RFID reader with extensive communication between two or more RFID tags. Once the connectivity of two or more mated RFID tags is established, the two or more mated RFID tags can continue to communicate with each other using direct connections between the RFID tags. In this manner, the two or more mated RFID tags may send a signal, data, or other information between the mated RFID tags.

Before looking at the protocols that mated or connected tags may use to communicate with each other or with other devices, a description is given of how RFID devices may be used to provide RFID functionality to associated components, such as telecommunications equipment, whereby the RFID devices can provide a signal indicating a condition relating to the associated component when interrogated by an RFID reader.

As broadly embodied in FIGS. 1-15 examples of connectors, connector assemblies, cables, and mapping systems are disclosed, in which RFID technologies are employed, along with one or more condition responsive devices in certain embodiments. As discussed more fully below, the RFID technologies can be configured in different ways, resulting in different functionalities. In addition, complete RFID transponders and/or portions of RFID transponders may be located on a plug (such as a connector), a socket (such as an adapter), a housing, a separate object, or other components (or portions thereof). The condition responsive devices are responsive to one or more conditions and/or change in condition such as a state of contact, electrical contact closure, temperature, pressure, humidity, light, or capacitance (and/or impedance). The condition responsive device may be user-operated, for example by pressing a push button or connecting or disconnecting a plug from a socket, or the condition responsive device may be a passively operated sensor, or both could be employed together. Further, the condition and/or change in condition indicated by the condition responsive device may permit or preclude operation of a given RFID transponder. Alternatively, such condition and/or change in condition may simply be registered and/or reported by the RFID transponder without altering the operational status of the RFID transponder. It should also be understood that elements of the embodiments below may be mixed in different ways to achieve still further embodiments and functionality within the scope of the invention. Although the illustrated embodiments are directed to passive RFID transponders, further embodiments include one or more active RFID transponders depending upon the particular functionality of the RFID transponder system desired.

Although the embodiments described herein are directed to RFID systems used with components of telecommunications equipment, such as fiber optic connectors and adapters or copper connector and adapters and other fiber optic and/or copper components, further embodiments are used with non-telecommunications equipment, particularly regarding components that interconnect and/or are exposed to various conditions for which it is desirable to know the location, connectivity, and/or conditions of the components. The terms plug and socket are generally used herein to define portions of components that are adapted for connecting to one another, such as a connector that is received by an adapter, and are not necessarily limited to standard plugs and sockets.

Figure 2:
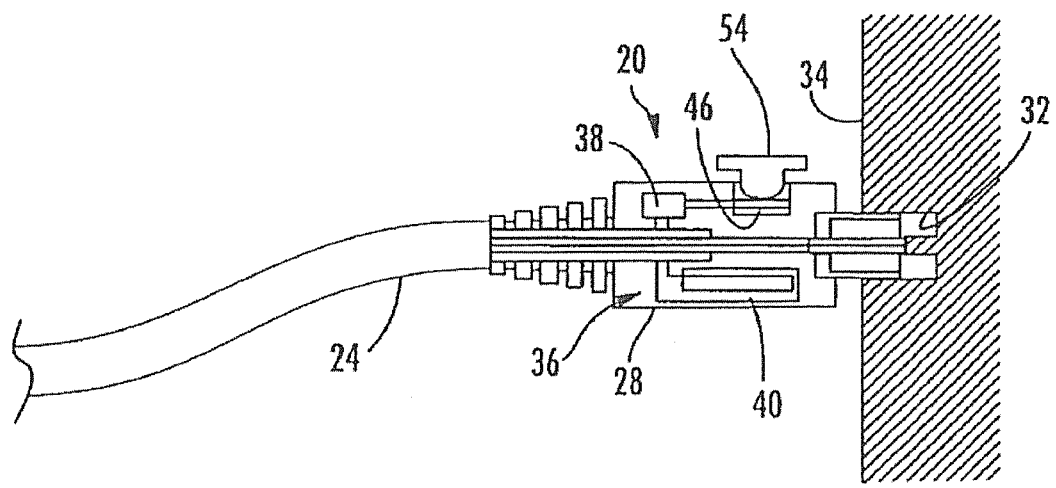
FIG. 2 is a schematic view of the plug of FIG. 1 as inserted in a socket.
Figure 3:
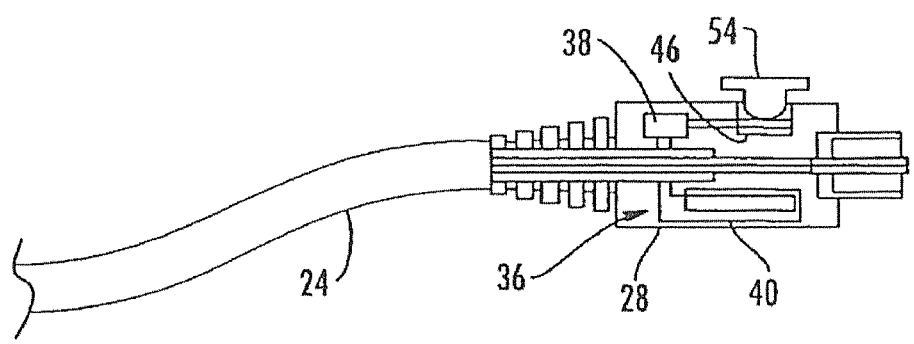
FIG. 3 is a schematic view of a plug as in FIG. 1, wherein the plug defines an fiber optic connector.

FIGS. 1-3 show one example of a plug, such as connector 20, for terminating an optical fiber 22. The plugs of further embodiments include alternative types of connectors such as MT, MJ, RJ, SC, LC, etc., as well as connector fanout assemblies, housings for protectively sealing the connector-adapter interface, and the like. As shown in FIGS. 1-3, fiber 22 is located within an end of cable 24. Fiber 22 is terminated at ferrule 26 located within body 28 of connector 20. Strain relief 30 is provided at one end of body 28 to protect fiber 22. Cable 24 may or may not be pre-connectorized. Connector 20 may be inserted into a socket, such as adapter 32, within a housing 34. Again, adapter 32 and housing 34 are illustrative only, and any type of socket disposed in a component can be employed.

As shown, an RFID transponder 36 is attached to body 28. Therefore, the RFID transponder is associated with the plug. The RFID transponder is associated with a plug, socket, component, or the like when the RFID transponder or a portion thereof, is position on or adjacent to the respective plug, socket, component, or the like such that the RFID transponder, when activated, is capable of communicating the identity and/or general location of the associated plug, socket, component, or the like such that an RFID reader is able to ascertain the identity and/or general location of the associated plug, socket, component, or the like. The RFID transponder 36 illustrated in FIGS. 1-3 includes an RFID integrated circuit chip 38 and an RFID antenna 40 electrically connected by wiring 42. RFID transponder 36 may be in the form of an RFID tag. If desired, RFID transponder 36 may be embedded within body 28, or it may be attached to the inside or outside of the body, such that the RFID transponder is associated with the connector 20.

Additional wiring 44 electrically connects RFID integrated circuit chip 38 to a condition responsive device 46 mounted on or within (as shown) body 28 of connector 20. Condition responsive device 46 is capable of detecting at least one condition and/or change of condition and providing a signal to RFID transponder 36 responsive to the detected condition. In some embodiments, RFID transponder 36 and/or condition responsive device 46 are selectively activatable and, when activatable, may be activated when interrogated by an RFID reader to communicate a signal representative of the detected condition. Further embodiments comprise RFID transponders and/or condition responsive devices that are activatable when the associated component is in physical contact with a technician and/or mating component; while still further embodiments comprise RFID transponders and/or condition responsive devices that are continuously activatable.

Activation may be accomplished via an RFID reader (not shown), having its own RFID circuitry and RFID antenna, which may or may not also be located on an integrated circuit chip as in RFID transponder 36 of some embodiments. The RFID reader along with an associated database and processing element, in accordance with some embodiments, comprise portions of an RFID system for identifying a plurality of components, as described more fully below. The RFID reader and/or its associated elements may be a separate device from the component that includes adapter 32, such as a handheld RFID reader or an RFID reader disposed somewhere on the premises within the RFID read range of the components being monitored, depending on the desired application and functionality. Alternatively, an RFID reader may be located on a housing of a component, such as the type in FIG. 2 that holds adapter 32, and may be either associated with or spaced apart from adapter 32. One RFID reader, whether in a remote housing or associated with the component comprising the adapter, may be used to interact with multiple RFID transponders. It should be understood that certain aspects are directed to connector and RFID transponder designs alone, for use with one or more RFID readers, while other aspects are directed to the combination of the RFID transponder(s), RFID reader(s), and/or components associated with the RFID transponder(s).

RFID integrated circuit chip 38 may include stored information such as serial number, type of connector, cable type, manufacturer, manufacturing date, installation date, location, lot number, performance parameters (such as attenuation measured during installation), identification of what is at other end of the cable, etc. Such information could be preloaded on RFID integrated circuit chip 38 at manufacture or upon installation via an RFID reader. Furthermore, the RFID reader, and any associated database and/or processing element, of certain embodiments includes stored information relating to one or more RFID transponder and/or components in order to facilitate identification, mapping, or other processing of the information received from one or more RFID transponders. More specifically, the RFID reader includes information that correlates a unique identification number of an RFID transponder to a particular plug and/or socket, to a particular component (such as a fiber optic cable assembly with one or more connectors), to other portions of the component (such as correlating a first connector of a fiber optic cable to a second connector, or grouping multiple adapters of a patch panel, etc.), to past and/or current mating components, and any other parameter, connection, association, or other information that a technician may want know or record when working with and/or monitoring the one or more components.

Some embodiments comprise a condition responsive device for detecting a condition relating to the component with which the condition responsive device is associated. Condition responsive device 46 of FIGS. 1-3 comprises a mechanical switch, or more specifically a push button switch, with two electrical contacts. This exemplary embodiment and other similar embodiments enable the condition responsive device to detect selective physical contact of the component, or more specifically the plug and/or condition responsive device, by a technician and/or a mating component, such as a socket. Alternatively, the condition responsive device 46 could be a capacitance or impedance sensor, or other mechanical, electrical, or electromechanical sensors. As illustrated, condition responsive device 46 is actuated by a hand-operated push button 54, which may be spring loaded, but other activation structures such as slides, contact sensors, and the like are also provided in further embodiments. In alternative embodiments, push button 54 can be activated by contact with housing 34 upon insertion of connector 20 into adapter 32. Wiring 44 connects condition responsive device 46 to RFID integrated circuit chip 38 to provide information regarding the condition (such as physical contact by the technician, receipt of the plug into the socket, or the like) detected by the condition responsive device. For example, certain two-position switches define a condition responsive device that detects and provides information regarding the position of the switch. Thus, when activated, RFID transponder 36 would provide information regarding the condition detected by the at least one condition responsive device 46 and may also provide other information, such as identification information relating to the RFID transponder and/or other RFID transponders. A technician could identify a given cable/connector by having an RFID reader (not shown) interrogate a panel full of plug RFID transponders associated with the connectors and then pressing the button on the given cable/connector, and monitoring the output from the RFID reader to look for which cable/connector indicates a certain condition and/or change in condition. Importantly, this could be accomplished if desired without otherwise manipulating, plugging, or unplugging the cable/connector, thus preventing undesirable disconnection of services (albeit temporary) to one or more customers. The RFID transponder 36 of FIGS. 1-3 is configured and wired to always return a signal to RFID reader, regardless of the condition detected by the condition responsive device, although alternative RFID transponders could be altered to turn on and off depending on the condition, as discussed below.

In addition, RFID transponder 36 is adapted to communicate with a similar separate or interrelated RFID transponder or RFID reader (not shown) on housing 34 and/or associated with a respective adapter 32, if desired. The ability of the RFID transponders to communicate with one another, to store information of two or more RFID transponders, and/or communicate with the RFID reader information of two or more RFID transponders is discussed more fully below. Furthermore, the RFID transponders of alternative embodiments selectively assist a technician working with the components associated with the RFID transponders. For example, it would be possible to indicate to the technician which adapter a connector should be received upon the pushing of a button on the connector. RFID transmission from the RFID transponder(s) or the RFID reader could trigger such indication in various ways.

Figure 4:
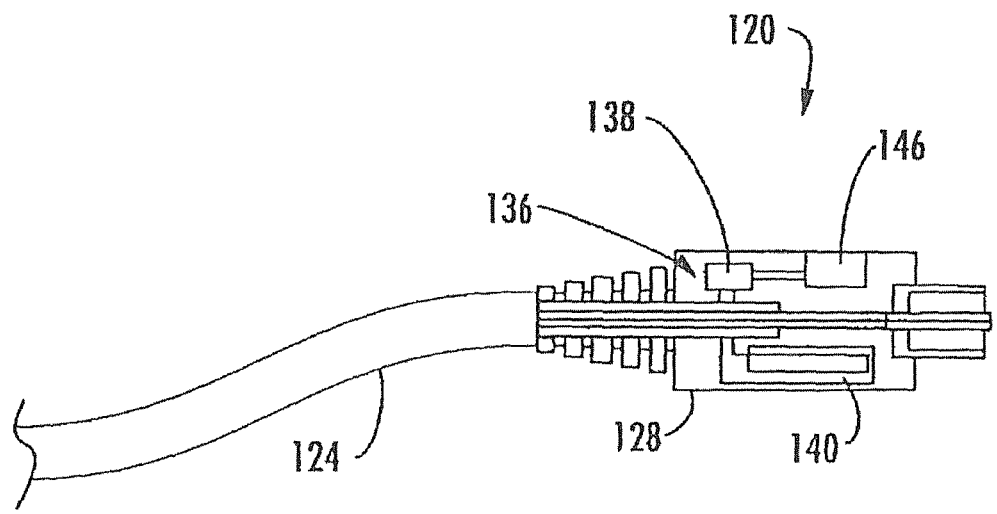
FIG. 4 is a schematic view of an alternate embodiment of a plug including an condition responsive device.

FIG. 4 shows a modified connector 120 in which condition responsive device 146 is activated without a mechanical component such as button 54 of FIGS. 1-3. Condition responsive device 146 could thus comprise an integrated sensor to sense at least one of contact, electrical contact closure, temperature, pressure, humidity, light exposure, capacitance (and/or impedance), or other environmental condition or parameter. It may be more economical to manufacture such a connector 120, wherein the moving parts of a push button are not needed.

The condition responsive device 146 could be configured to detect contact or other input from a technician, by detecting a temperature or lighting change due to gripping or covering the sensor, shining a light or laser on it, etc. In such case, condition responsive device 146 could function as above to indicate two alternative conditions. Further embodiments include a condition responsive device 146 that functions to indicate a range of conditions corresponding for example to a present condition, past condition, past high or low conditions, etc. with reference to temperature, humidity, pressure, etc. Such information could be important for detecting and diagnosing problems, and for repair and warranty considerations. Also, such information could be used to communicate via RFID transponder 136 that certain equipment should be shut down (for example in case of contact with liquid or overheating is indicated). For certain of such functions, it may be necessary that condition responsive device 146 include a power source, either within the device itself or externally provided. Also, it may be necessary to include additional features on RFID transponder 136 or in RFID integrated circuit chip 138 to allow multiple functionalities, such as adding multiple bit capability, analog-digital converters, additional wiring connections, etc.

Figure 5:
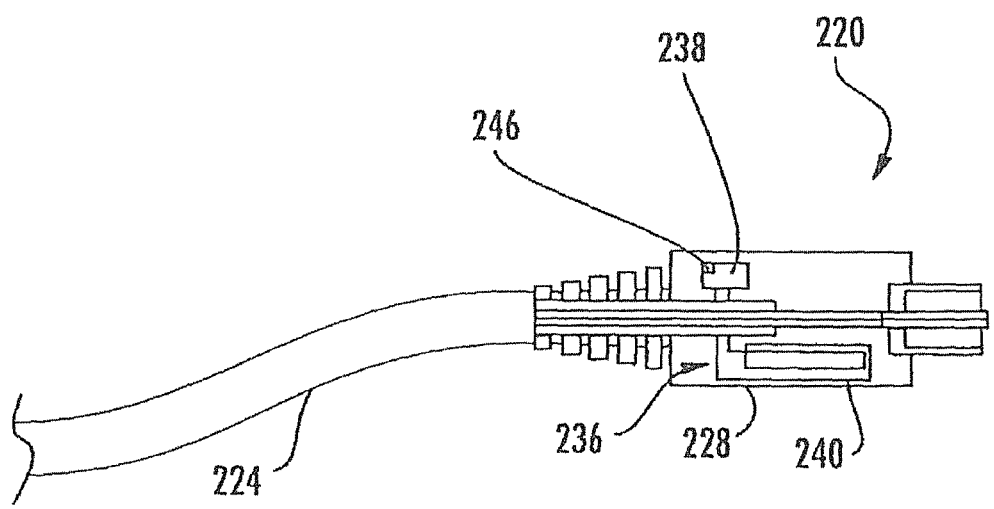
FIG. 5 is a schematic view of another alternate embodiment of a plug including a condition responsive device, wherein the condition responsive device is physically included within the integrated circuit chip of the RFID transponder.

FIG. 5 shows a connector 220 of a further embodiment in which a condition responsive device 246 is part of RFID integrated circuit chip 238, again activated without a mechanical component such as button 54 of FIGS. 1-3. By physically including the condition responsive device 246 within the RFID integrated circuit chip 238, the remaining structure is simpler than the structure of FIG. 4, which could provide advantages in manufacturing or use.

Figure 6:
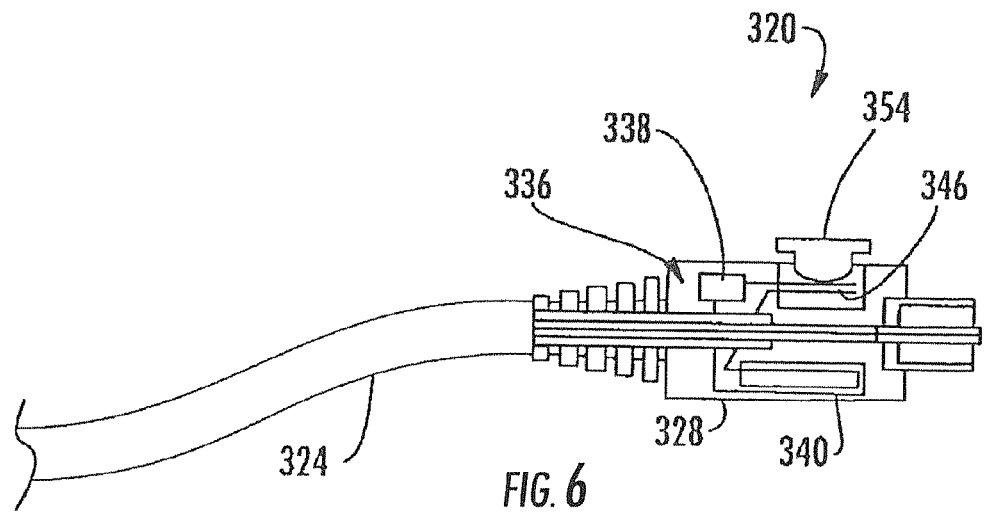
FIG. 6 is a schematic view of another embodiment of a connector including a condition responsive device comprising a push button switch, wherein pushing the button electrically connects and enables the RFID antenna.
Figure 7:
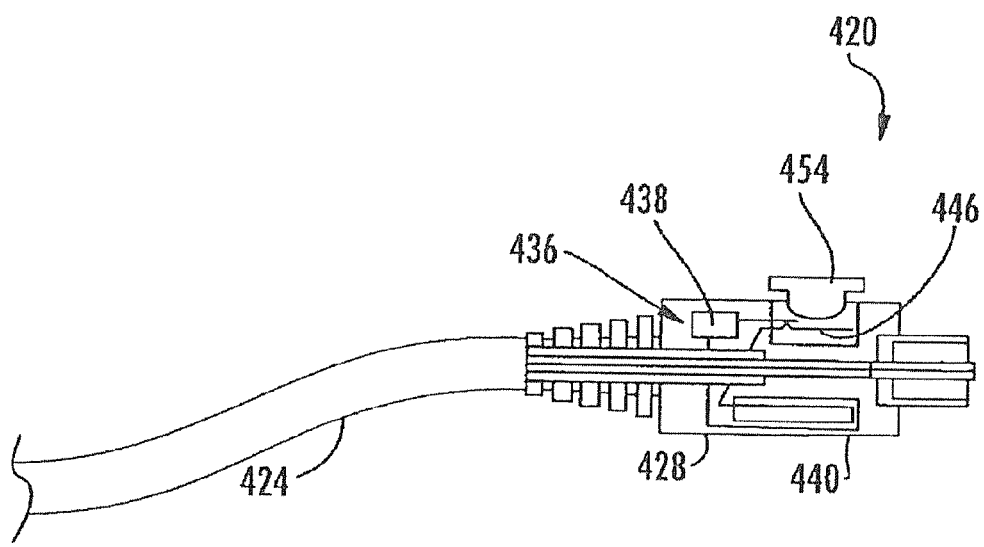
FIG. 7 is a schematic view of yet another embodiment of a connector including a condition responsive device comprising a push button switch, wherein pushing the button electrically disconnects and disables the RFID antenna.

FIG. 6 shows a connector 320 with a condition responsive device 346 that functions to complete an electrical circuit allowing RFID transponder 336 to turn on. That is, unless condition responsive device 346 detects a certain condition, RFID transponder 336 does not operate. As illustrated, push button 354 is provided for activating condition responsive device 346. Therefore, connector 320 could function somewhat like connector 20, whereby when button 354 is pressed a condition change occurs. However, the condition change occurrence is from off to on in FIG. 6, as pressing the push button 354 selectively electrically connects the condition responsive device 346 to the RFID integrated circuit chip 338. FIG. 7 shows another connector 420 with similar but opposite functionality. In connector 420, RFID transponder 436 is on unless it is turned off by the condition responsive device 446, for example by pressing button 454, which selectively electrically disconnects the condition responsive device 446 from the RFID integrated circuit chip 438. Again, the push buttons of FIGS. 1-3, 6, and 7 may be hand operated by a technician or actuated upon insertion of the plugs into the sockets or the like.

It should be understood that use of mechanical condition responsive devices and push buttons with the embodiments of FIGS. 6 and 7 are optional. Thus, the more passive condition responsive devices of FIGS. 4 and 5 in further embodiments may also be utilized with the connectors of FIGS. 6 and 7, wherein the RFID transponders are turned on or off by signals resulting from the condition responsive devices. Also, multiple condition responsive devices, both passive and active could be employed. For example, pressing a button could actuate one condition responsive device to activate an RFID transponder, while a past or present temperature condition signal could be obtained from another condition responsive device. Still further embodiments include condition responsive devices that detect a condition generated by a condition generating device, as described more fully below.

Figure 8:
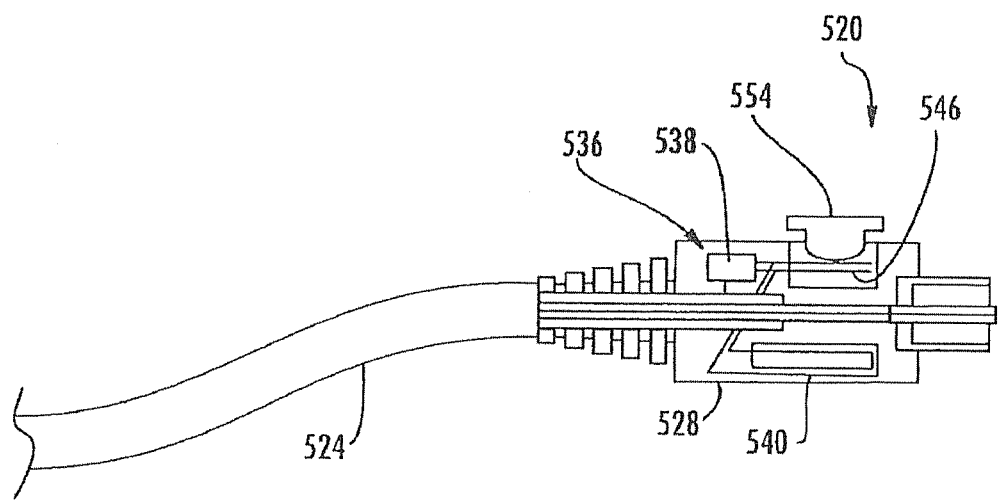
FIG. 8 is a schematic view of still another embodiment of a connector including a condition responsive device, wherein the condition responsive device comprises a variable impedance element.

FIG. 8 shows another alternate connector 520 wherein input from a shunted condition responsive device 546 is provided to RFID integrated circuit chip 538. Condition responsive device 536 could be, for example, a variable impedance element, wherein the condition responsive device varies the impedance by changing the resistance or capacitance (and/or inductance) of the condition responsive device. The variable impedance element may be placed in parallel with or in series with the leads of the RFID antenna 540. Other shunted devices and configurations could be employed for condition responsive devices of further embodiments.

FIGS. 9-14 show various embodiments in which RFID functionality is achieved or altered when a connector is inserted into an adapter. In such fashion, the electrical connections and configurations also function as a condition responsive device, akin to those discussed above, in which the insertion of a plug into a socket makes the electrical connection that effects RFID functionality. Further, the plug-in embodiments of FIGS. 9-14 may also be used in conjunction with the concepts and structures discussed above.

Figure 9:
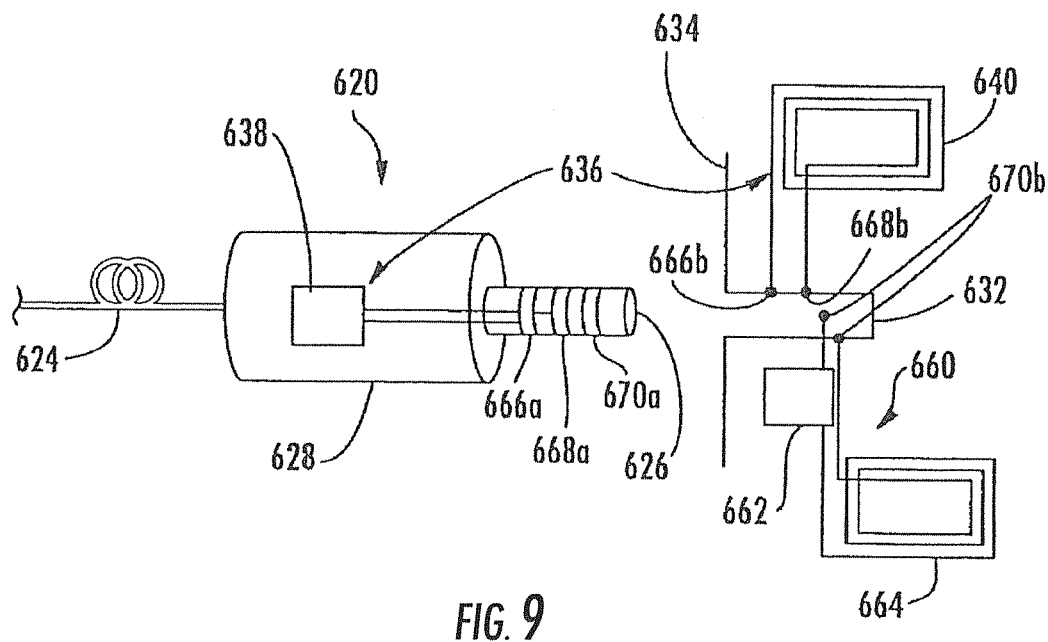
FIG. 9 is a schematic view of an embodiment of a plug having an associated plug RFID transponder and a socket having an associated socket RFID transponder, wherein functionality of the plug RFID transponder and/or the socket RFID transponder is effected by insertion of the plug into the socket.

FIG. 9 shows a connector 620 and adapter 632 whereby each includes an RFID transponder 636 and 660. RFID transponder 636 includes an RFID integrated circuit chip 638 on connector body 628 and an RFID antenna 640 on housing 634. RFID transponder 660 includes an RFID integrated circuit chip 662 and an RFID antenna 664 on housing 634. Pairs of contact points, such as electrical connections 666a, 668a, and 670a on connector 620 mate with connections 666b, 668b, and 670b on housing 634. The connections 666-670 are located proximate the ferrule 626 and adapter 632, although such connections could be located on other places on body 628 and housing 634. Also, to prevent the RFID antennas from operating as a monopole when a single contact is made, four sets of connections may be used in some embodiments to isolate the antennas.

When connector 620 is received by the adapter 632, electrical contact is made between connections 666a and 666b, 668a and 668b, and 670a and 670b. Thus, the embodiment shown in FIG. 9 effectively operates similar to the embodiment of FIG. 7, wherein the RFID transponders 636 and 660 are not functional, unless activated by the receipt of the connector 620 into the adapter 632. Functionally, interrogation will show additional RFID transponders when such connection is made. Also, such structure provides a double check function to ensure that an inserted connector is properly received by the adapter. The structure also beneficially does not rely for such function on the relative location of the connector and housing or adapter, which as mentioned above, can lead to inaccurate results at times in various scenarios.

By placing part of RFID transponder 636 for connector 620 on housing 634, space is saved on the connector, which can be useful in some situations so as to allow for RFID functionality on a relatively smaller connector. Also, such arrangement leaves more room for other structures or condition responsive devices on the connector. If desired, the electrical contacts 670a and 670b could be omitted, allowing the RFID transponder 660 to be functional at all times. Also, RFID transponder 660 could be replaced by a transceiver to provide alternative functionality.

Figure 10:
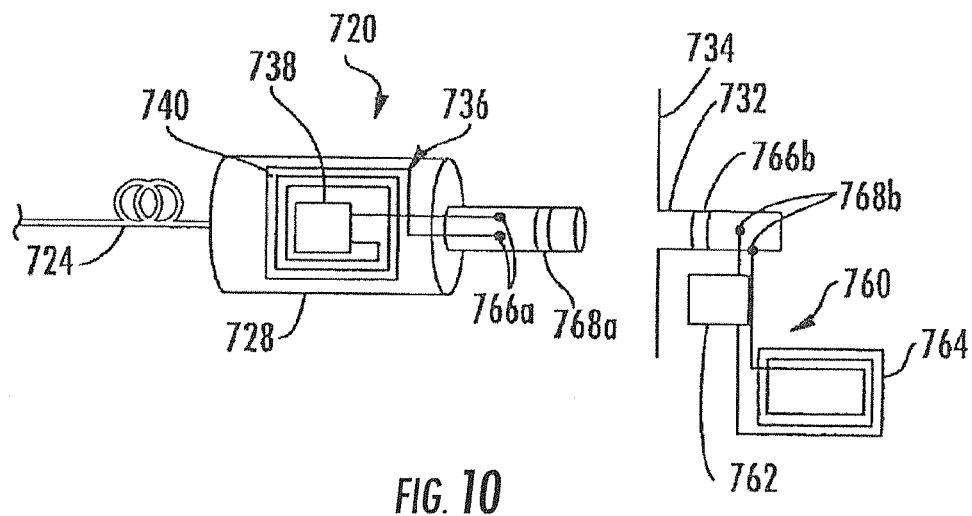
FIG. 10 is a schematic view of another embodiment of a plug having an associated plug RFID transponder and a socket having an associated socket RFID transponder, wherein functionality of the plug RFID transponder and/or the socket RFID transponder is effected by insertion of the plug into the socket.

FIG. 10 shows a modified version of that shown in FIG. 9, wherein connector RFID integrated circuit chip 738 and connector RFID antenna 740 comprise connector RFID transponder 736 that is associated with the connector 720. The adapter RFID integrated circuit chip 762 and RFID antenna 764 comprise adapter RFID transponder 760 associated with the adapter 732 of housing 734. Connections 766a and 766b, and 768a and 768b, respectively, are provided to electronically connect parts of the two RFID transponders 736 and 760 so as to render them activatable. Otherwise, connector 720 and adapter 732 are similar to that shown in FIG. 9.

Figure 11:
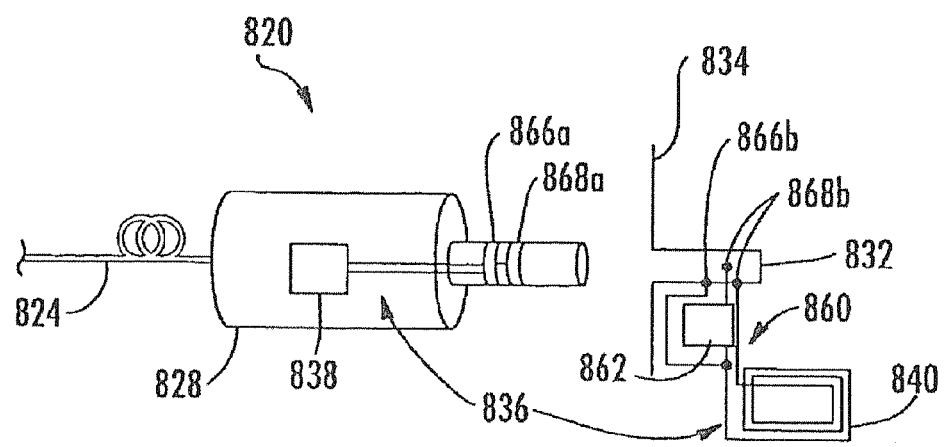
FIG. 11 is a schematic view of yet another embodiment of a plug having an associated plug RFID integrated circuit chip and a socket having an associated socket RFID integrated circuit chip and including one RFID antenna, wherein functionality of the plug RFID transponder and/or the socket RFID transponder is effected by insertion of the plug into the socket.

FIG. 11 shows another modification in which RFID transponders 836 and 860 share a single RFID antenna 840. A connector RFID integrated circuit chip 838 is associated with the connector 820, and an adapter RFID integrated circuit chip 862 is associated with the adapter 832. Connections 866a and 866b, and 868a and 868b, respectively, provide electrical contact to complete the activatable connector RFID transponder 836 and adapter RFID transponder 860.

Figure 12:
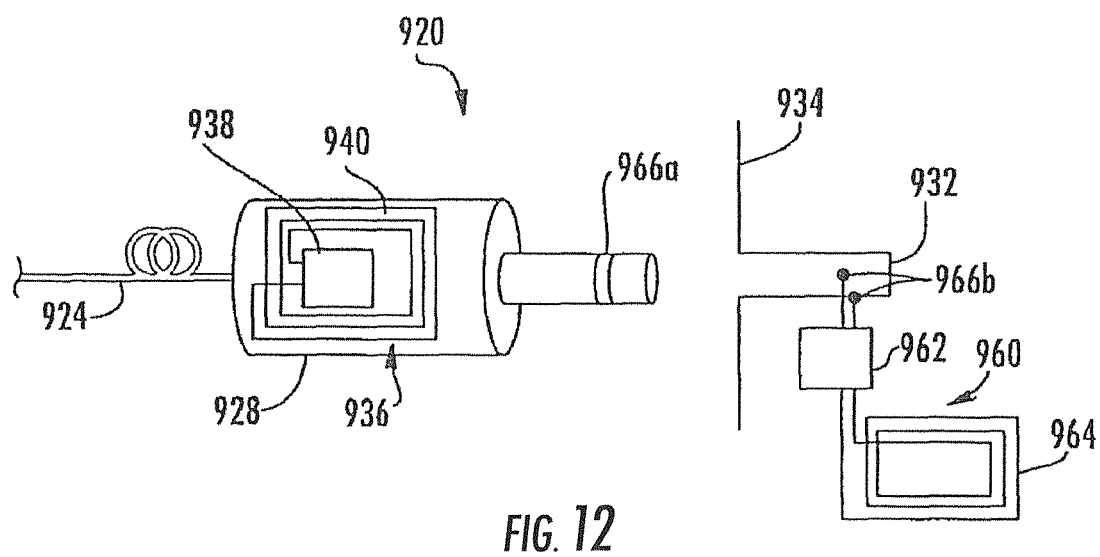
FIG. 12 is a schematic view of another embodiment of a plug having an associated plug RFID transponder and a socket having an associated socket RFID transponder, wherein functionality of the socket RFID transponder is effected by insertion of the plug into the socket, further including a contact closure port function.

FIG. 12 shows yet another embodiment in which connector RFID transponder 936 associated with connector 920 and adapter RFID transponder 960 associated with adapter 932 of housing 934 are always complete and active. Therefore, no connections are required to electrically connect RFID integrated circuit chip 938 and RFID antenna 940, or RFID integrated circuit chip 962 and RFID antenna 964. However, the connections 966a and 966b may be used to indicate connection of the plug and the socket, in addition to the functionality described below. It should be kept in mind that any of the condition responsive device embodiments of FIGS. 1-8 could be used with this embodiment, or any other, to detect a condition and/or a change in condition of either of the RFID transponders.

Adapter RFID transponder 960 associated with the adapter 932 of housing 934 includes an electrical contact closure port in communication with RFID integrated circuit chip 962, activated through connections 966a and 966b, which come into contact upon insertion of connector 920 into adapter 932. Therefore, upon insertion of connector 920 into adapter 932, the contact closure condition of RFID transponder 960 will change. Interrogating the RFID transponders and looking for a transponder indicating a change in contact closure condition would identify the RFID transponder associated with the just-connected adapter. If desired, information regarding the adapter and/or connector could then be communicated to the reader regarding one or both of the RFID transponders and the associated component. It should be understood also that the structure and functionality of FIG. 12 could be reversed. Therefore, the RFID transponder in connector 920 could instead include the contact closure port.

Figure 13:
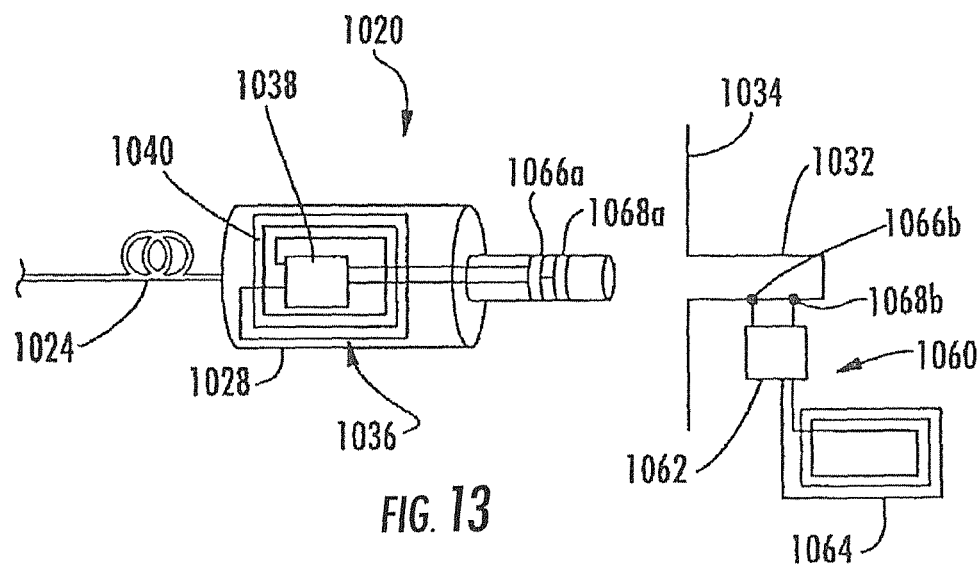
FIG. 13 is a schematic view of still another embodiment of a plug having an associated plug RFID transponder and a socket having an associated socket RFID transponder, wherein functionality of the socket RFID transponder is effected by insertion of the plug into the socket, further including an alternate contact closure port function.

FIG. 13 shows an alternative embodiment in which connector RFID transponder 1036 is again entirely located in connector 1020 and adapter RFID transponder 1060 is again entirely located in housing 1034. Both RFID transponders 1036 and 1060 of the embodiment of FIG. 13 are activatable at all times. Electrical connections 1066a and 1066b are provided to allow for a contact closure input adapter for RFID integrated circuit chip 1038. Electrical connections 1068a and 1068b provide a contact closure port output for RFID integrated circuit chip 1062. The contact closure ports created by the contacts can communicate with each other.

This embodiment may or may not rely upon insertion of connector 1020 into adapter 1032. Therefore, this embodiment may operate as above, where insertion of the connector closes both contact closure ports generating a detectable change of condition signal for both the connector and adapter. Alternatively, after insertion of all connectors 1020 into adapters 1032 within housing 1034, the contact closure condition of all housing RFID transponders 1060 could be set to a given value (open or closed). Then, the RFID transponder 1060 for a given adapter could be directed to change its contact closure condition, which would be detected by the associated connector RFID transponder 1036, which would change its condition accordingly. Another polling to determine which connector RFID transponder 1036 had just changed its condition would provide information as to which two RFID transponders 1036 and 1060 in the system were connected. This process could be done the opposite way (starting with the connectors) if desired. Further, this process could be done serially, adapter-by-adapter or connector-by-connector, to map an entire equipment panel in fairly automated fashion. One advantage to the structure of FIG. 13 and the functions made possible thereby are flexibility. Identification can be done by selectively plugging or unplugging, if desired, or by polling without unplugging or any manipulation of buttons by way of directing condition changes via a reader or the like.

Figure 14:
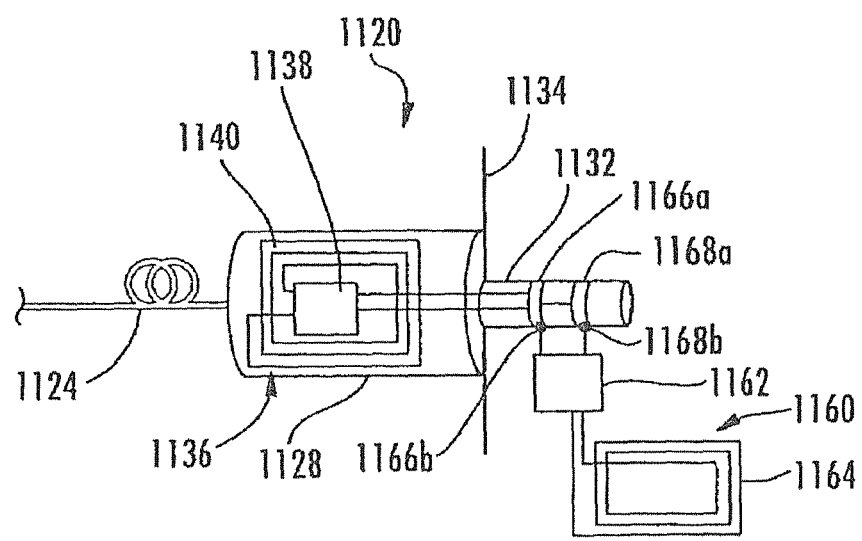
FIG. 14 is a schematic view of another embodiment of a plug having an associated plug RFID transponder and a socket having an associated socket RFID transponder, wherein functionality of the socket RFID transponder is effected by insertion of the plug into the socket, further including an alternate bidirectional contact closure port function.

FIG. 14 shows another connector 1120 and housing 1134 combination of a further embodiment, wherein the RFID transponders 1136 and 1160 have bi-directional contact closure ports formed by connections 1166a and 1166b, and 1168a and 1168b. Therefore, the RFID integrated circuit chips 1138 and 1162 could be directed to output their identifications to the other where it would be read and saved, and polling could be conducted to retrieve such information from one or both. In some embodiments, an RFID transponder transfers identification information to one or more other RFID transponders using N bit transfer techniques, wherein one integrated circuit forces contact closure (open or closed) N times at a regular interval to provide bits of data (such as identification information) to the other integrated circuit(s) that senses the forced contact closure. Still further embodiments transfer information between or among RFID transponders using other electrical techniques and/or thermal or optical techniques. This approach of RFID transponders identifying one another would allow automatic identification to obtain matching connector and adapter information. RFID integrated circuit chips 1138 and 1162 could require additional power and additional bi-directional communication and sensing functionality. Again, this approach allows cataloging of an entire panel of connections without plugging or unplugging, or the manipulating of buttons or the like.

Figure 15:
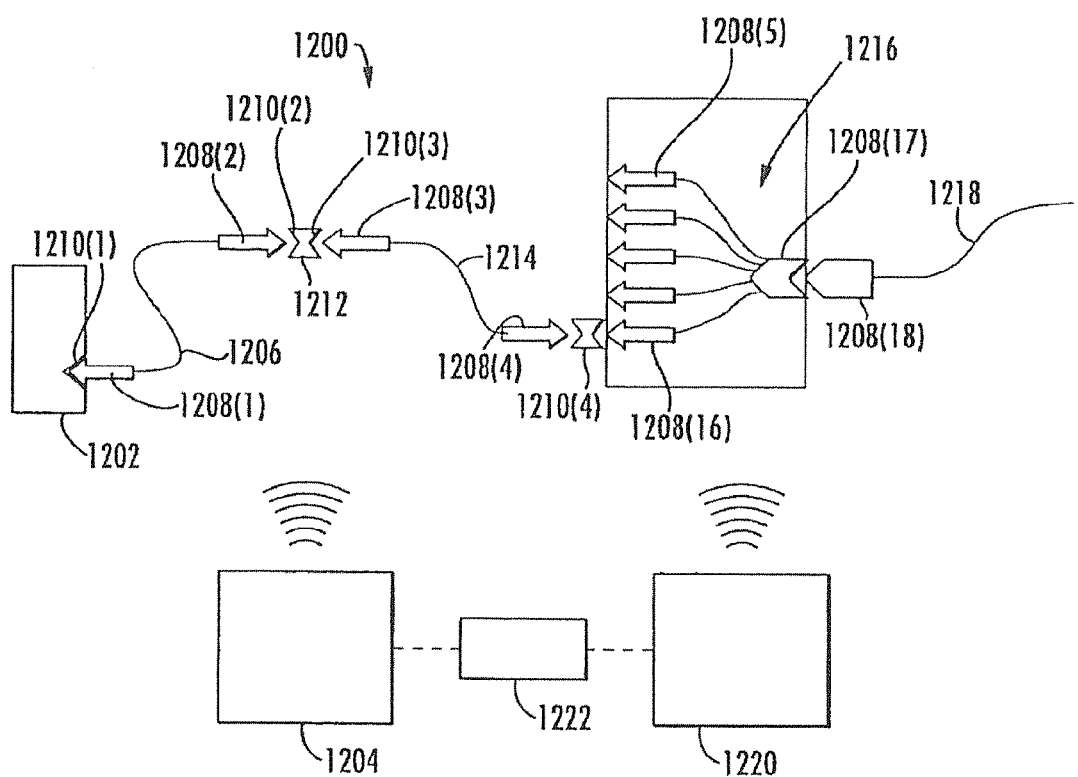
FIG. 15 is a schematic view of one example of a system for mapping fiber optic connections across a network utilizing RFID transponders.

FIG. 15 shows one representative example of a system incorporating certain features of the connectors disclosed above to allow mapping fiber optic cable connections utilizing RFID functions. Various embodiments provide for mapping of the physical location of the components associated with the RFID transponders and/or mapping of the connectivity of the components associated with the RFID transponders. Referring again to FIG. 15, as schematically illustrated, system 1200 includes a housing 1202, a reader 1204 and a fiber optic cable 1206. Each end of fiber optic cable 1206 includes a connector 1208(1), 1208(2). Other examples of connectors 1208(3)-1208(18) are further described below. For simplicity of illustration, housing 1202 is shown to include one adapter 1210(1) that receives one connector 1208(1). However, housing 1202 may have a plurality of such adapters for receiving a plurality of connectors. Housing 1202 may comprise any element along a fiber optic cable network, such as a router, server, any connected device, wireless device, patch panel, adapter, or even another connector, etc. Therefore, any device to which a fiber optic cable may be attached could comprise housing 1202.

Each connector 1208 has an associated RFID transponder (not visible in FIG. 15). The RFID transponder may be one of the types discussed above. Thus, the RFID transponders may be entirely or partially located on the connectors. Also, a condition responsive device for detecting a condition and/or change of condition and communicating it to the RFID transponders may also be included. The condition responsive device may include electrical connections, a push button operated device, contact closure structures, or other structures for detecting insertion of a connector plug into an adapter. The adapter may also include an RFID transponder for receiving signals from a condition responsive device and transmitting signals related to the detected condition. Therefore, upon receipt of a connector 1208 into an adapter 1210, a change in condition is registered via one or more of the structures or functions described above. A polling of RFID transponders before and after such insertion, or via sending contact closure instructions and re-polling, will identify which connector and/or adapter have been connected. Information within the inserted connector, in this case 1208(1), will also identify that connector 1208(2) is or should be at the opposite end of fiber optic cable 1206. This information may be made available to the technician, for example for connecting connector 1208(2) to a particular adapter, for connectorizing the cable, etc.

This mapping functionality may be extended. For example, connector 1208(2) may further be received by an adapter 1210(2) in another housing 1212, which may be a patch panel or adapter. Again, a condition responsive device may detect insertion, which can be reported in various ways to reader 1204. Housing 1212 may have another adapter 1210(3) for receiving another connector 1208(3), and the process may continue further, insertion of connector 1208(3) bringing forth identification of connector 1208(4) at the other end of fiber optic cable 1214.

The information can be flexibly managed in various ways, as desired. For example, adapters 1210(2) and 1210(3) may be considered a single adapter connecting two connectors 1208(2) and 1208(3), if desired. Also, internal cabling (not shown) could connect adapters 1210(2) and 1210(3), for example as on the inside of a patch panel housing or the like. The internal cabling could include RFID functionality, for example by connecting to connectors 1208(2) and 1208(3) directly or via adaptors having structure for detecting or communicating change of condition, as described above. Alternatively, a database could hold information regarding which adapters are internally connected within a patch panel by correlating the unique identifications of the respective adapters, and RFID functionality could be employed with the connectors and adapters only.

Cables having different types and numbers of connectors at each end can employ RFID functionality as well. For example, as illustrated, fiber optic cable 1216 comprises a break-out for twelve individual optical fibers. The break-out may also be referred to as a fiber optic fanout assembly. Connectors 1208(5) through 1208(16) (not all shown) each terminate one of the fibers, whereas connector 1208(17) is a multifiber connector. Connector 1208(4) is connected to connector 1208(16), either directly or via an adapter, such as adapter 1210(4). Fiber optic cable 1218 is another twelve-fiber cable having a multifiber connector 1210(18). Each of the connectors and adapters may include RFID transponders, as discussed above, that are associated with condition responsive devices for detecting a condition such as insertion. Also, the RFID transponder on each connector on a cable may be provided at the manufacturing plant and/or in the field with information regarding the other connector or connectors attached to that cable. In addition or alternatively, the RFID transponders may be able to communicate with one another to identify one another and store in memory (preferably in the integrated circuit chip) the identity of the other RFID transponder for subsequent communication with an RFID reader, for example, using the N bit transfer described above with respect to the embodiment of FIG. 14. Therefore, plugging in one end of a cable provides some information via the RFID transponder as to the other end of the cable and/or fiber. It should be understood that any number of fibers could be employed within a cable, and any number of break-outs from the multifiber cable could be employed. Also, a multifiber cable with multifiber connectors at each end could be employed.

It should be kept in mind for purposes of the present disclosure, that a connector connecting directly to other components or another connector (rather than to a patch panel adapter per se, or the like) may be considered an adapter and housing into which the connector is connected. Therefore, the benefits described herein may be recognized when two connectors are connected together, with or without an adapter, and one of the connectors or the adapter would therefore be considered the "adapter" for the other connector in that situation. Thus, in some scenarios, the element to which the connector connects would be considered the "adapter" for purposes of this disclosure.

The RFID transponders for multifiber cables may hold additional information, such as fiber order and polarity. If the multifiber connectors include information regarding the ordering of fibers within the multifiber connectors, the functionality can be improved by mapping out with more certainty the communication path throughout the system. Such mapping may include mapping the physical location, the connectivity, and/or other parameters relating to the various components Such a system 1200 can employ a second reader 1220 if desired. Reader 1220 could be a handheld reader used by a technician. In addition or alternatively, reader 1220 could be a second fixed reader (such as reader 1204), so that the range of system 1200 can be extended over a wider area than by using reader 1204 alone. If desired, a database 1222 may be stored in a general or special purpose computer, connected to readers 1204 and 1220 either wirelessly and/or by hardwiring. Database 1222 can maintain various records as discussed above, including records of connector/adapter connections, RFID interrogations and responses, past and present conditions, and changes of condition, etc.

The use of condition responsive devices to indicate a change of condition such as plug insertion, possibly in combination with cataloged information regarding connector identification by fiber optic cable and/or fiber ordering, can provide various levels of detail and functionality for installing, servicing, or altering a network. It is therefore possible, using the teachings above, to create a network that essentially self-maps itself upon insertion and/or pressing of buttons or other activation of condition responsive devices. Also, such system beneficially does not depend only on proximity of RFID transponders in connectors and adapters, although such functionality could be utilized within a part of such system if desired.

Referring again to the embodiments disclosed herein that comprise condition responsive devices, still further embodiments comprise condition generating devices that are associated with one or more components (and/or the plug or socket of the respective component) and that are adapted to generate the condition sensed by the condition responsive device. Exemplary embodiments include the systems illustrated in FIGS. 9-14, wherein one of the connector RFID transponder and the adapter RFID transponder includes a condition responsive device and the other RFID transponder comprises a condition generating device. The condition generating device of various embodiments generates the condition when a certain event occurs, for example when the plug is inserted into the socket, when the RFID transponder comprising the condition generating device is communicated with by the RFID reader to instruct the generation of the condition, and/or when similar events occur, such that the condition responsive device is able to detect the condition. The condition generated by the condition generating device may be of any form, non-limiting examples include an electric current via an electrical connection, a predetermined RF signal, visual indications, audible indications, or similar conditions. In some embodiments, the plug must be at least partially received by the socket in order for the condition responsive device to detect the generated condition, whereas in other embodiments the two components with which the condition responsive and condition generating devices are associated need not be in physical contact and/or within a certain distance of one another. The condition generating device of the embodiment of FIG. 14 forces the contact closure that is detected by the condition responsive device (portion of the integrated circuit) of the other RFID transponder to enable the RFID transponder with the condition responsive device to receive information via the N bit transfer from the RFID transponder with the condition generating device. Use of the condition generating device and condition responsive device enable two RFID transponders to communicate with one another in order to correlate the two components, to transfer and/or store identification information about one another, and/or to perform other functions desired by the technician.

As described above with reference to FIG. 15, one component may comprise two or more RFID transponders associated with various portions of the component, such as, for example, a fiber optic drop cable with two or more connectors wherein each connector comprises an associated RFID transponder. In some embodiments, each of the RFID transponders associated with the component includes identification information of the other RFID transponders and/or the portions of the component associated with the RFID transponders. In such embodiments, communication with one of the RFID transponders may enable an RFID reader to receive information, such as identification information and the like, about more than one RFID transponder to improve the performance of the RFID system. In additional embodiments, the RFID transponders of separate components (or the same component) are adapted to communicate with one another in order to allow information of each of the RFID transponders to be communicated to an RFID reader via communication with only one RFID transponder. In certain of these additional embodiments, the integrated circuit chip of the RFID transponder comprises a memory into which may be stored identification information of other RFID transponders and from which such additional identification information may be retrieved to provide to an RFID reader and/or other RFID transponders. The memory of certain embodiments may permanently retain information, may delete information at predetermined intervals, may delete information when commanded, and/or may delete information upon occurrence of a particular event, such as disconnecting the plug from the socket, to list one non-limiting example.

In view of the above, it is apparent that many modifications and re-combinations of the above embodiments or their components may be done. Connectors, adapters, cables including connectors, connections comprising a connector and adapter, and mapping systems may include some or multiple of the above features and functionality. One or more condition responsive devices can detect differences in condition. Communication of the detected conditions, either by or between RFID transponders, can provide useful information for identifying or mapping one or more connectors, cables or connections, including mapping all connections on a single panel or across a network. Reliance on alternative systems requiring relative proximity RFID function is not necessary, as detected conditions of one sort or another provide information. Changes in condition brought about by insertion of a connector into an adapter can be designed with connector tolerances that make the resulting information more accurate than proximity-based systems as well, thereby reducing or eliminating false positives. Further, such change-of-condition based systems allow for panels to efficiently include more connections, more tightly spaced. Also, past and present condition information can be stored for later RFID communication for various functions and purposes. If desired some, most or substantially all of the RFID transponder hardware may be located on the connector or housing, depending on the desired application, the need for additional connections, power, etc.

It may be desirable when a plurality of RFID tags may be connected, as in the environments described above, that the RFID tags may communicate directly with each other or with one or more other devices. By employing the disclosed protocols and related systems and methods, as set forth in more detail below in the detailed description and accompanying Figures, the RFID tag-to-tag connectivity can be determined without the need to burden the RFID reader with extensive communication between two or more RFID tags. Once the connectivity of two or more mated RFID tags is established, the two or more mated RFID tags can continue to communicate with each other using direct connections between the RFID tags. In this manner, the two or more mated RFID tags may send a signal, data, or other information between the mated RFID tags.

Figure 16:
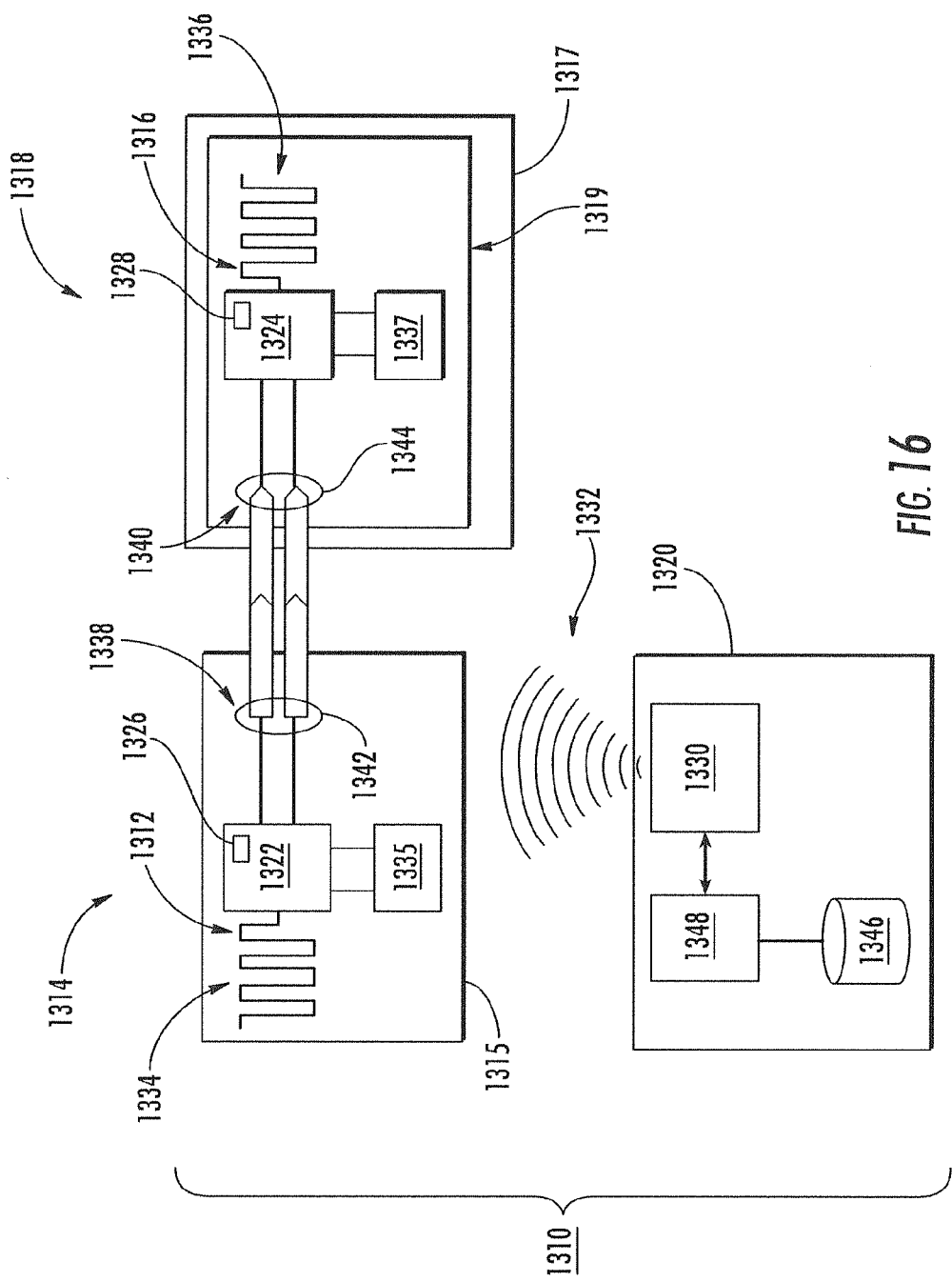
FIG. 16 is a schematic diagram of an exemplary environment, a connection mapping system in which radio frequency (RF) identification (RFID) tags are disposed in connector components and adapter components, in which it may be desirable for a plurality of RFID tags to be connected and communicate with each other.

FIG. 16 is a schematic diagram of an exemplary environment in which a plurality of RFID tags may be connected, where it is desirable for a plurality of RFID tags to communicate with each other. FIG. 16 illustrates an exemplary embodiment of a component mating system 1310 where an RFID tag 1312 of a first connector 1314 is in electrical communication with an RFID tag 1316 of a second connector 1318 to further describe possible information exchanges between the two, including identification information. Note that although FIG. 16 is discussed with respect to RFID tag 1312 and RFID tag 1316, the RFID tags 1312 and 1316 could be positioned on a device. In addition, a device that emulates an RFID tag could be used in place of RFID tags 1312 and 1316. In one embodiment, a device 1312 and a device 1316 could be used in the place of RFID tag 1312 and RFID tag 1316 and the two devices can communicate with each other in the same manner as the RFID tag 1312 and the RFID tag 1316 communicate with each other, as described in more detail below.

The RFID tags 1312 and/or 1316 can be configured to allow the mating or demating of the first connector 1314 to and/or from the second connector 1318. The first connector 1314 may include a body 1315 adapted to be mated to a body 1317 of the second connector 1318. The second connector 1318 in this example includes an internal chamber 1319 disposed in the body 1317 of the second connector 1318 that includes a geometry configured to receive a complementary, fitted geometry of the body 1315 of the first connector 1314. The mating or demating may be based on the identification information provided by the first connector 1314 to the second connector 1318, or vice versa, or based on identification information exchanges between both the first and second connectors 1314, 1318, although not required. The mating or demating may also be based on lack of receiving identification information provided by the first connector 1314 to the second connector 1318, or vice versa. The RFID tags 1312, 1316 may perform processing to determine if the connectors 1314, 1318 should be mated or demated, or such processing may be performed by an RFID reader system 1320 or other system. The RFID reader system 1320 or other system may be able to wirelessly communicate with one or more of the RFID tags 1312, 1316 to receive the identification information as an example. The mating or demating of the connectors 1314, 1318 may be based on whether the identification information is deemed proper according to defined criteria or connection configurations desired.

In this regard, as illustrated in the example in FIG. 16, the first connector 1314 is mated to the second connector 1318. The integrated circuit (IC) chips 1322, 1324 of the first and second connectors 1314, 1318 each include memory 1326, 1328 that have stored identification information regarding the IC chips 1322, 1324. Thus, this identification information can be used to identify the first IC chip 1322 distinctly from the second IC chip 1324, and thus the first connector 1324 distinctly from the second connector 1318. The identification information can be communicated to an RFID reader 1330 provided as part of the RFID reader system 1320.

In one embodiment, the RFID tags 1312, 1316 are passive devices. Passive RFID devices do not require their own power sources. When the RFID tags 1312, 1316 in this embodiment are passive tags, the IC chips 1322, 1324 may be powered from RF energy harvested or received from the RFID reader 1330 through antennas 1334, 1336 coupled to the IC chips 1322, 1324. Power can be harvested from an interrogation signal 1332 transmitted by the RFID reader 1330 in the RFID reader system 1320 and received by the antennas 1334, 1336. Thus, passive RFID devices may be desired when providing a power supply is not desired or otherwise impractical due to cost or size limitations. The antennas 1334, 1336 may be any type of antenna that is tuned to the desired reception and/or transmission frequency(s), including but not limited to a dipole and monopole antenna. The antennas 1334, 1336 can be external to or integrated in the IC chips 1322, 1324.

The IC chips 1322, 1324 enable certain functionality and communication for the RFID tags 1312, 1316. In this regard, capacitors 1335, 1337 may be communicatively coupled to the IC chips 1322, 1324 to store excess energy received through the antennas 1334, 1336 for providing power to the IC chips 1322, 1324 when the antennas 1334, 1336 are not receiving an RF signal from an RFID reader and/or to supplement such power during times when power demand may be greater than harvested through the antennas 1334, 1336. Note that the RFID tags 1312, 1316 could also be semi-passive or active devices. A semi-passive RFID tag may include a power source to assist in powering the RFID tag. An active RFID tag includes a power source and a transmitter.

Also in this embodiment, both the first connector 1314 and the second connector 1318 provide interfaces 1338 and 1340, respectively, that contain one or more electrical leads 1342, 1344 each coupled to their respective IC chips 1322, 1324. The electrical leads 1342, 1344 are designed to come into direct contact with each other when the first connector 1314 is mated to the second connector 1318 in this embodiment to form a wired connection, as illustrated in FIG. 16. When the electrical leads 1342, 1344 come into direct electrical contact in this embodiment with each other as a result of the connection, a connection event occurs. In response, the IC chips 1322, 1324 of the first and second connectors 1314, 1318, respectively, initiate communications with each other over the electrical leads 1342, 1344. Contact other than direct ohmic contact between the electrical leads 1342, 1344 is also possible, including capacitive and inductive coupling.

Identification information regarding the identity of the first connector 1314 and the second connector 1318 stored in memory 1326, 1328, respectively, can be exchanged and stored to signify the connection of the first connector 1314 to the second connector 1318. Similarly, lack of exchange of identification information can be used to signify the lack of connection between the first connector 1314 and the second connector 1318. Thus, for example, if the IC chip 1322 in the first connector 1314 receives and stores an identification of the IC chip 1324 in the second connector 1318, it can be determined by the RFID reader 1330 interrogating the IC chip 1322 in the first connector 1314 that the first connector 1314 is mated with the second connector 1318. The same is possible in vice versa—the RFID reader 1330 can interrogate the second connector 1318 and identification information stored in the IC chip 1324 regarding the identification information of the IC chip 1322 can be used to determine if the second connector 1318 is mated with the first connector 1314. Lack of identification information exchanged between the first connector 1314 and the second connector 1318 can be used to indicate to the first connector 1314 and/or the RFID reader 1330 that the first connector 1314 is not mated with the second connector 1318. In an alternate embodiment, discussed more fully below, each of the RFID tags 1312, 1316 may determine that it is mated with one or more of the other RFID tags without using the RFID reader 1330.

Either one or both of the first connector 1314 and the second connector 1318, or either one or both of the first RFID tag 1312 and the second RFID tag 1316, can also communicate their own identification information as well as exchange identification information with the other connector 1318, 1314, respectively, as well as the RFID reader 1330. The first and second connectors 1314, 1318, or either one or both of the first RFID tag 1312 and the second RFID tag 1316, may communicate other information stored in memory, such as serial number, type of connector, cable type, manufacturer, manufacturing date, installation date, location, lot number, performance parameters (such as attenuation measured during installation), identification of what is at other end of the cable, etc. Such information could be preloaded in the memory 1326, 1328 of the RFID tags 1312, 1316 at manufacture or upon installation via the RFID reader 1330.

The RFID reader system 1320 coupled to the RFID reader 1330 may be configured to receive identification information pairs signifying the first connector 1314 mated to the second connector 1318 within the range of the RFID reader 1330. This information may be stored in a database 1346 provided in the RFID reader system 1320 processed in a component management system 1348, as illustrated in FIG. 16. The component management system 1348 may include control systems and related software for processing the information received from the first and second connectors 1314, 1318 to perform a number of tasks. These tasks include, but are not limited to, recording the identification information pairs, providing identification information pairs information to a technician, recording which connectors are not mated, and providing other troubleshooting and diagnostic information, as will be described in greater detail below. The processing may include decision-making on whether to communicate to one or both of the RFID tags 1312, 1316 to provide instructions to cause the RFID tags 1312, 1316 to allow mating or demating of the components with which the RFID tags 1312, 1316 are associated, based on the identification information. Furthermore, the component management system 1348, and any associated database 1346 and/or processing element, includes stored information relating to one or more RFID tags in order to facilitate identification, mapping, or other processing of the information received from one or more RFID tags. More specifically, the RFID reader 1330 includes information that correlates a unique identification number of an RFID tag 1312, 1314 to the first and second connectors 1314, 1318, respectively, and to any other parameter, connection, association, or other information that a technician may want to know or record when working with and/or monitoring the first and second connectors 1314, 1318.

Figure 17:
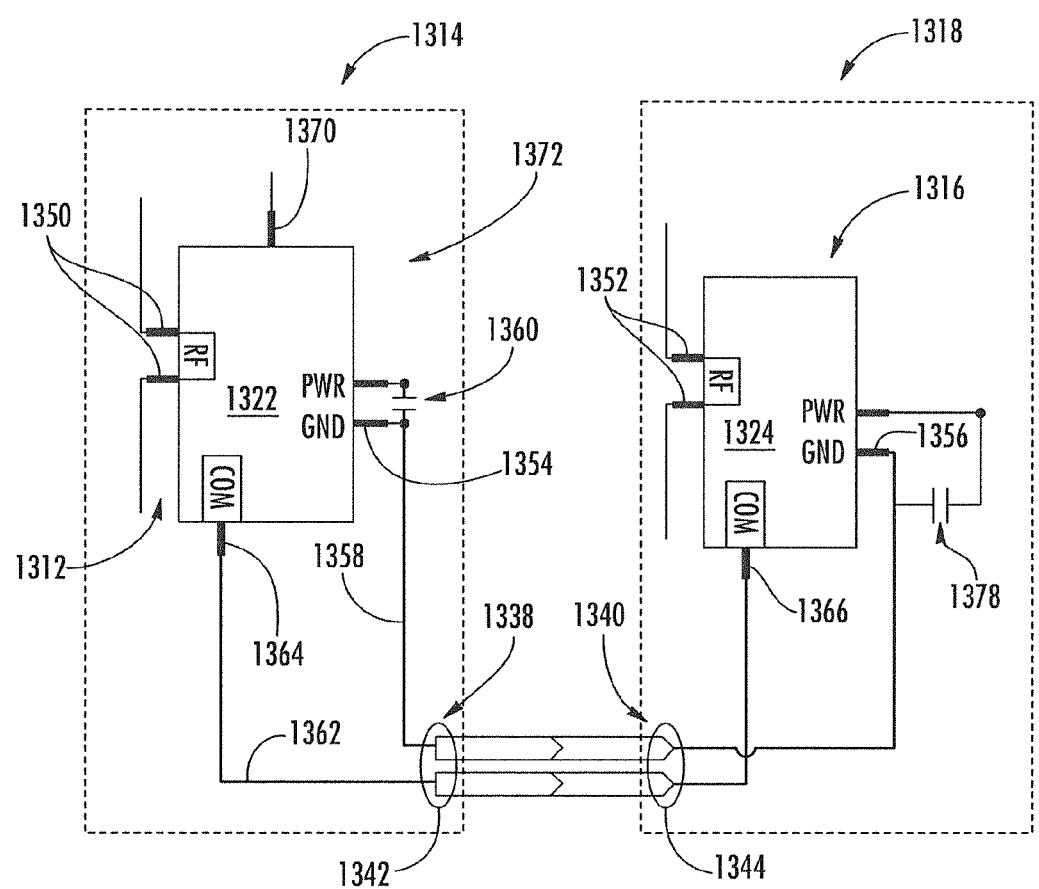
FIG. 17 is a schematic diagram of exemplary connections between integrated circuits disposed in a connector component connected to an adapter component, each including RFID tags.

To provide further detail regarding how the IC chips 1322, 1324 in the RFID tags 1312, 1316 may be communicatively coupled together by example, FIG. 17 is provided. FIG. 17 illustrates more detail on an exemplary chip and pin layout of exemplary IC chips 1322, 1324 of the RFID tags 1312, 1316 of the component mating system 1210 in FIG. 16. The IC chips 1322, 1324 are electrically and communicatively coupled to each other when their respective first connector 1314 and second connector 1318 are mated. The IC chips 1322, 1324 of the RFID tags 1312, 1316 are coupled together when connections are made between the first and second connectors 1314, 1318.

Each IC chip 1322, 1324 in this embodiment contains RF inputs in the form of RF input pins 1350, 1352. The antennas 1334, 1336 (FIG. 16) coupled to the IC chips 1322, 1324 are configured to receive RF communication signals from the RFID reader 1330 (FIG. 16) via the RF input pins 1350, 1352. Note that the RF input pins 1350, 1352 can also support any type of antenna, including dipole antenna, monopole antenna, loop antenna, or any other type of antenna. An antenna coupled to the RF input pins 1350, 1352 may be configured to operate at any frequency desired, including 2.4 GigaHertz (GHz) and 900 MegaHertz (MHz), as examples.

Figure 23:
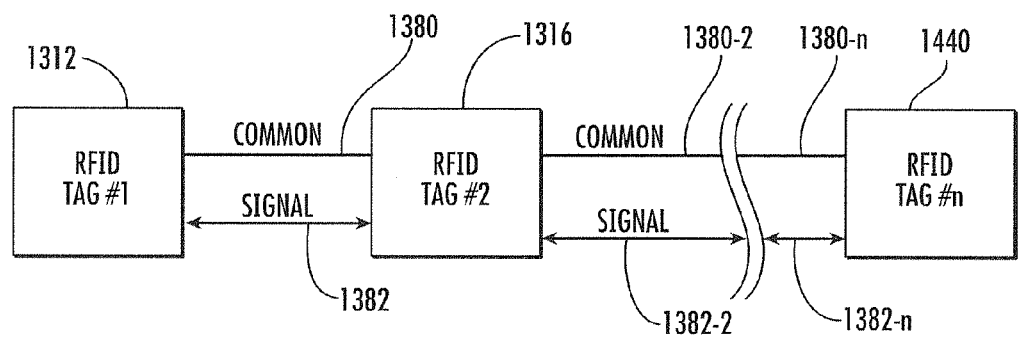
FIG. 23 is an exemplary chain configuration in which a plurality of RFID tags may be connected to each other.

As further illustrated in FIG. 17, the RFID-enabled IC chips 1322, 1324 can be designed to be coupled in a point-to-point fashion. Ground is coupled together for each IC chip 1322, 24 when a connection is established by coupling ground pins 1354, 1356 of the IC chips 1322, 1324 together via a ground line 1358. One or more capacitors 1360 may be coupled between PWR and GND to provide energy storage of power received from RF communication signals to allow the IC chip 1322 to operate when not being energized by an RF communication signal. Also as illustrated in FIG. 17, the IC chips 1322, 1324 are configured to communicate with each other over a serial communication line 1362. Each IC chip 1322, 1324 contains at least one communication pin 1364, 1366. Each communication pin 1364, 1366 allows serial communications to and from the IC chips 1322, 1324. Additional IC chips, as part of additional RF tags not shown in FIG. 17, could be connected together in a daisy-chain fashion (as shown in FIG. 23 below) and communicatively coupled to each other if a second communication pin is provided in the IC chip.

A capacitor bank 1378 may also be provided in the RFID tag 1316 to be charged during interrogation by the RFID reader 1330 and to provide reserve power when not being interrogated by the RFID reader 1330 or when energy from the RFID reader 1330 is sporadic or otherwise not strong enough to power the second connector 1318.

It is noted that FIGS. 16 and 17 are illustrative environments only and that there may be other environments or settings in which RFID tags may be connected or mated to each other. For example, if an RFID-equipped power connector is incorrectly disconnected, a host computer system may be able to detect the disconnection, but not before power is interrupted. If the power connector is allowing power to be supplied to a critical device, such as a medical device for example, the interruption of power could be life threatening. Another example might be a coupling in a gas or fluid delivery system where it is critical to know that a connection is made and made properly. This is true in medical applications where an incorrect connection can cause serious injury or death, in industrial applications that use various process gases or high pressure hydraulic connections, and in many other applications where two parts that are designed to be mated need to be tracked to ensure that a proper connection exists and/or to provide an indication or alarm when said connection has been broken. The tag communications disclosed herein may also be used in environments that include, but are not limited to, the above examples, as well as environments involving industrial controls, apparel, consumer electronics, machinery, sensor systems, electrical interconnects, fluid couplings, beverage dispensing, security authentication, and lockable containers. In fact, the tag communications disclosed herein may be applied anywhere that two mated parts need to be identified to manage their connection or disconnection.

In addition, in certain embodiments, multiple RFID tags may be connected to each other via a variety of means (including but not limited to ohmic, inductive, and capacitive connections) and configurations (including but not limited to point-to-point, bus, ring, and star configurations). FIGS. 18 and 22-26 show a representative sample of some of these configurations. These figures do not show all possible connection means, topologies or combinations of connection means and topologies, but are simply a representative sample.

Figure 18:
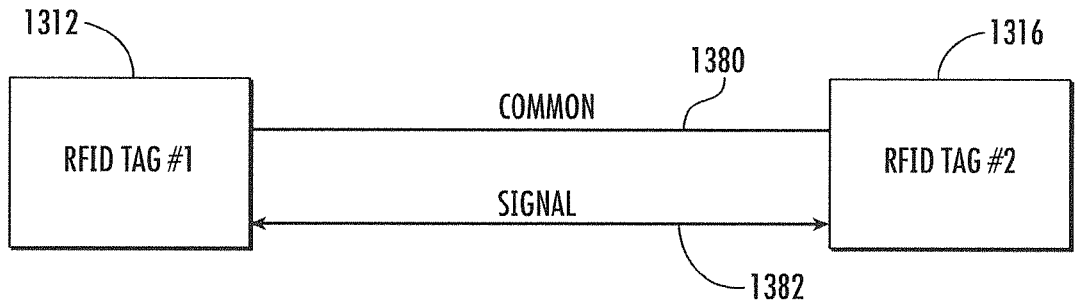
FIG. 18 is an exemplary point-to-point configuration in which a plurality of RFID tags may be connected to each other.

FIG. 18 shows two RFID tags 1312, 1316 in an exemplary point-to-point configuration. Note that although FIG. 18 is discussed with respect to RFID tag 1312 and RFID tag 1316, the RFID tags 1312 and 1316 could be positioned on a device. In addition, a device that emulates an RFID tag could be used in place of RFID tags 1312 and 1316. In one embodiment, a device 1312 and a device 1316 could be used in the place of RFID tag 1312 and RFID tag 1316 and the two devices can communicate with each other in the same manner as the RFID tag 1312 and the RFID tag 1316 communicate with each other, as described in more detail below.

The two RFID tags 1312, 1316 are connected by a common line 1380. The two RFID tags 1312, 1316 may be connected to each other via a variety of means (including but not limited to ohmic, inductive, and capacitive connections). In the embodiment of FIG. 18, a shared bidirectional signal line 1382 also connects the two RFID tags 1312, 1316. In an alternate embodiment, as seen below in FIG. 22, two signal lines are used, each being unidirectional. A shared bidirectional line may offer economy of hardware (ports, circuit traces, etc.) but may require more sophisticated electronics and protocols. The alternate embodiment having two unidirectional signal lines may utilize simpler electronics, but may use more costly interconnect hardware. Each of the various configurations of connected RFID tags disclosed herein can use either a shared bidirectional signal line or two or more unidirectional signal lines.

In order to determine connectivity between one or more tags such as the RFID tags 1312, 1316 in FIG. 18, some information needs to be transferred between the RFID tags 1312, 1316. In general, the actual nature of the physical signals shared between the tags is irrelevant and could function via a variety of approaches. It is possible to determine connectivity via an RFID reader (such as the RFID reader 1330 in FIG. 16) and a set of tags (such as the RFID tags 1312, 1316) with even the most simplistic tag-to-tag communication mechanism; i.e., a continuous signal that can be asserted or de-asserted by one tag upon command from the reader and sensed by the mating tag when it is connected. The following is an example of how connectivity may be determined pursuant to a known procedure.

An RFID reader (such as the RFID reader 1330 in FIG. 16) can query a set of tags (such as the RFID tags 1312, 1316) looking for any new connections. Note that additional RFID tags besides the RFID tags 1312, 1316 may exist in any potential set of mated RFID tags. If one of the RFID tags 1312 or 1316 is identified with a new connection, the RFID reader 1330 can ask that RFID tag 1312, 1316 to assert its "connectivity signal." The RFID reader 1330 can then perform a query to the entire set of RFID tags looking for the single RFID tag that now can sense a "connectivity signal" from its mating RFID tag. Once the mated RFID tag responds, the RFID reader 1330 knows the two RFID tags that were just connected. Note, that to complete this query, the RFID reader 1330 has to issue a command so that the original RFID tag de-asserts its connectivity signal in preparation for the next set of queries that the RFID reader 1330 will have to perform. Also note that in order for the RFID reader 1330 to determine connectivity in this previous example, a significant number of unique queries must be performed and each of these queries may involve many Electronic Product Code Generation 2 (EPC Gen 2) commands and responses between the RFID reader 1330 and the set of RFID tags. In order to reduce the amount of time it takes for an RFID reader to determine connectivity between RFID tags, it is much more efficient to consider a more optimum approach, such as the embodiments and protocols disclosed herein.

The embodiments of the direct tag-to-tag communications disclosed herein allow the ability to transfer multiple bits of information, as opposed to merely asserting a continuous signal. This allows the unique identification associated with each of the RFID tags 1312, 1316 (or other potentially connected RFID tag) to be transferred between the two RFID tags 1312, 1316. Since these tag identifications can be transferred immediately after the connection is made, the identification of the associated mated RFID tag would already be stored and available to be read by the RFID reader 1330 when it detects that a new connection has been made. Thus, the RFID reader 1330 could simply perform a direct read of the mated tag identification from the original RFID tag that was identified as having a new connection. The connectivity information of a pair of RFID tags (such as RFID tags 1312, 1316) can now be determined by identifying and reading only one connected RFID tag. This greatly reduces the amount of communications required between the RFID reader 1330 and the set of RFID tags and provides redundancy in the case that one of the mated tags is not accessible to the RFID reader.

For the direct tag-to-tag communications embodiments disclosed herein, some type of protocol initiation method is required for the RFID tags 1312, 1316 to initiate the transfer of tag identifications. In one embodiment, each of the RFID tags 1312, 1316 is configured to directly exchange identification information using a common protocol, i.e., both RFID tags 1312, 1316 will use the same protocol to determine connectivity between the RFID tags 1312, 1316 and will use the same protocol to communicate between the connected RFID tags 1312, 1316.

Figure 19:
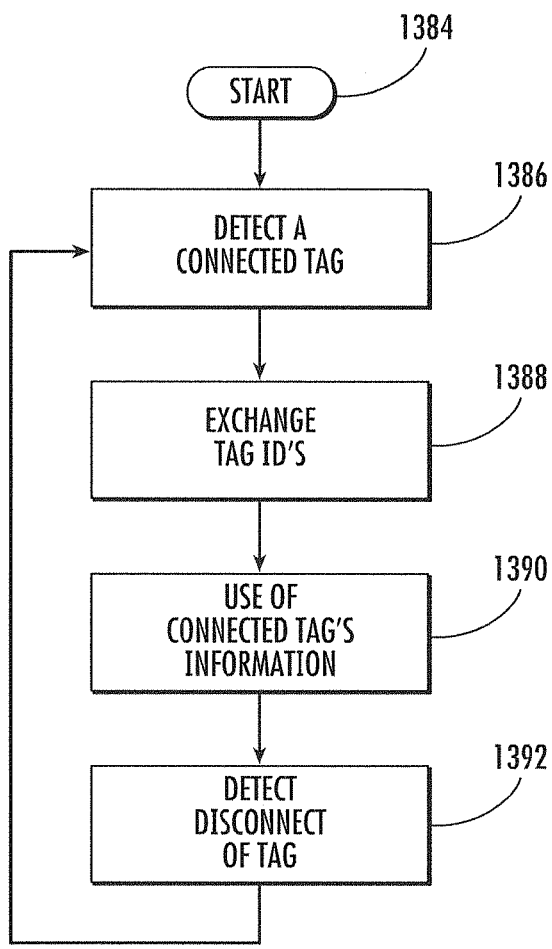
FIG. 19 is a generalized flowchart illustrating an exemplary overall protocol for communicating between a plurality of connected RFID tags according to an exemplary embodiment.

FIG. 19 is a generalized flowchart illustrating an exemplary overall protocol for determining connectivity and communicating between a plurality of connected RFID tags according to an exemplary embodiment. The protocol starts at block 1384. A signal may be asserted or de-asserted by one of the RFID tags 1312, 1316. In one embodiment, this signal may be asserted or de-asserted upon command from the RFID reader 1330. At block 1386, when the signal is sensed by one of the RFID tags 132, 1316, a connected tag is determined to be initiating a data transfer. This step in block 1386 may be performed electrically by the RFID tags 1312, 1316 prior to the initiation of the communications protocol. Once a connection between the RFID tags 1312, 1316 is detected, the RFID tags 1312, 1316 may then exchange tag identifications (block 1388). The information in the connected RFID tags 1312, 1316 may be used (block 1390) for any purpose for which they are suited. The information in the RFID tags may be accessed by the RFID reader at any time and may be used at any time. Once the connected tag identifications are exchanged, the tag identifications may also be used for any suitable purpose. This would include the use of the connected tag identities for any purpose, such as, but not limited to, communicating a connection event or the mated tag identities to a RFID reader. In another non-limiting embodiment, the mated RFID tags 1312, 1316 may be used to provide information regarding communication components, such as connectors and adapters as examples, in order to automatically discover communication components present in the RFID system and to determine when two particular communication components are connected or joined together and when the connection is separated. This information can be provided and used at any time, before or after the exchange of tag identifications. At some point, a disconnect of one of the mated RFID tags 1312, 1316 may be detected (block 1392). At this point, the method returns to the start and looks to detect another mated RFID tag. In one embodiment, the mated tag identity may be cleared and that information may be used for the RFID reader to determine that the RFID tags are no longer connected, or to determine a status of the RFID tags. In this regard, the term "disconnect" may include, but is not limited to, the act of unconnecting an RFID tag or other device. A RFID tag that is not connected may be referred to as in a state of disconnect.

Figure 20:
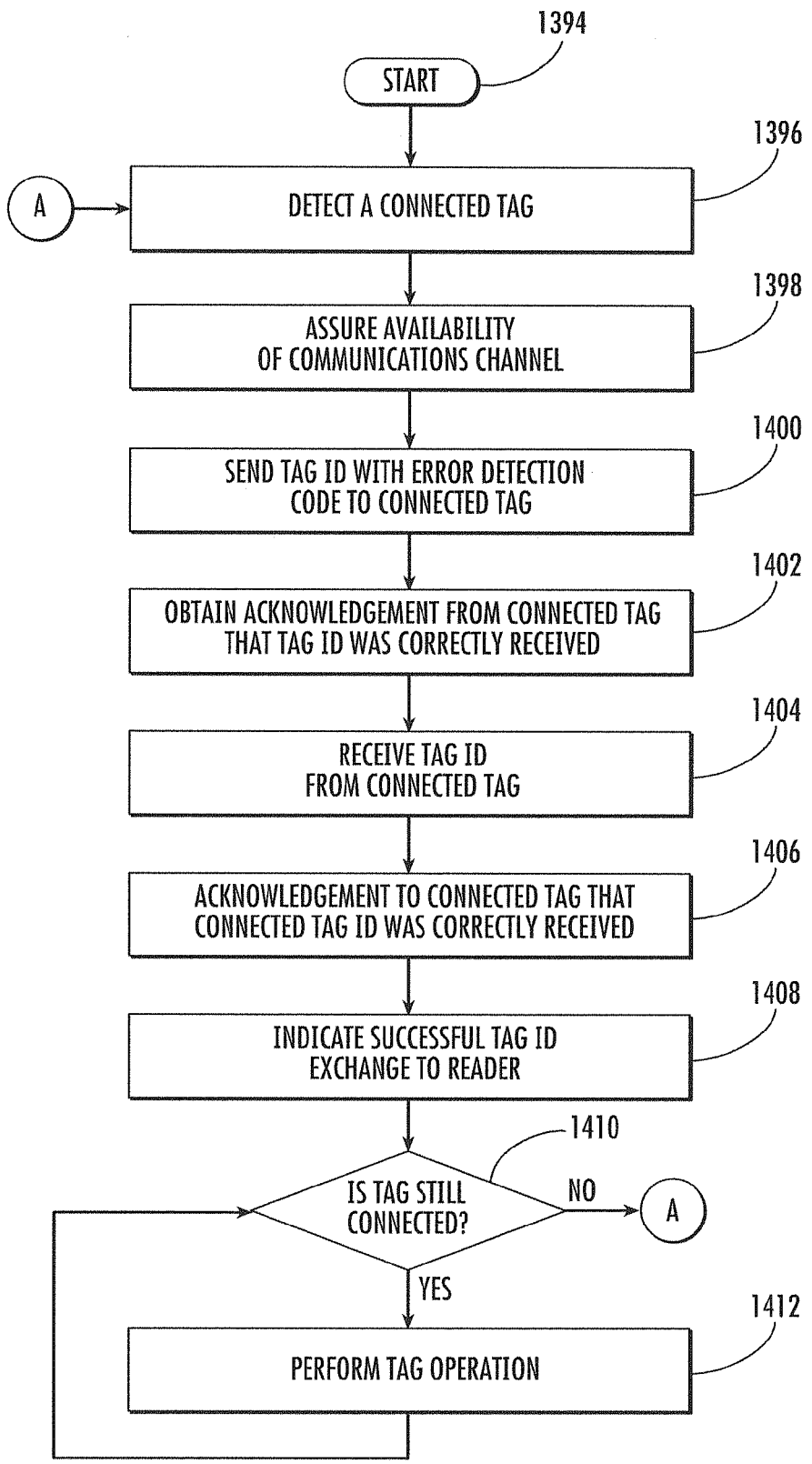
FIG. 20 is a exemplary flowchart illustrating the protocol of FIG. 19 in more detail, including the exchange of tag identifications between the plurality of connected RFID tags, according to an exemplary embodiment.

FIG. 20 is an exemplary flowchart illustrating the protocol of FIG. 19 in more detail, including the exchange of tag identifications between the plurality of connected RFID tags, according to an exemplary embodiment. In FIG. 20, the protocol starts at block 1394. A signal may be asserted or de-asserted by one of the RFID tags 1312, 1316. In one embodiment, this signal may be asserted or de-asserted upon command from the RFID reader 1330. At block 1396, when the signal is sensed by one of the RFID tags 1312, 1316, a connected tag is detected. Steps are then taken at block 1398 to assure the availability of a communications channel between RFID tags 1312, 1316. Standard methods of contention resolution can be applied to assure availability of the communications channel.

Once the availability of a communications channel is assured, at block 1400, a tag identification of a first RFID tag of the RFID tags 1312, 1316 is sent in a first message to the second RFID tag of the RFID tags 1312, 1316. In one embodiment, the first message may be sent from the first RFID tag to the second RFID tag over a shared connection, such as the signal line 1382 in FIG. 18. In one embodiment, the first message may also include an error detection code. Once the first message with the tag identification of the first RFID tag is received by the second RFID tag of the connected RFID tags, the second RFID tag will check to see if the tag identification was correctly received. In one embodiment, an error detection code sent in the first message may be used to determine if the tag identification of the first RFID tag was correctly received by the second RFID tag. If the tag identification was correctly received, the second RFID tag will send an acknowledgement to the first mated RFID tag to indicate that the tag identification was correctly received (block 1402). If the tag identification was not correctly received (i.e., an acknowledgement is not received), then the tag identification may be retransmitted up to a certain number of times. If the tag identification is not correctly received after a certain number of retransmissions, an error code may be entered in a memory of the RFID tag and the process continues in one embodiment. In another embodiment, the connected tag identification may be deleted so that a mistake is not made by reading erroneous information by the RFID reader.

In the embodiment of FIG. 20, the second RFID tag will then send a second message including its tag identification to the first RFID tag of the connected RFID tags (block 1404). In one embodiment, the second message may be sent from the second RFID tag to the first RFID tag over a shared connection, such as the signal line 1382 in FIG. 18. In one embodiment, the second message may also include an error detection code. Once the second message with the tag identification of the second RFID tag is received by the first RFID tag of the connected RFID tags, the first RFID tag will check to see if the tag identification was correctly received. In one embodiment, an error detection code sent in the second message may be used to determine if the tag identification of the second RFID tag was correctly received by the first RFID tag. If the tag identification was correctly received, the first RFID tag will send an acknowledgement to the second mated RFID tag to indicate that the tag identification was correctly received (block 1406). If the tag identification was not correctly received (i.e., an acknowledgement is not received), then the tag identification may be retransmitted up to a certain number of times. If the tag identification is not correctly received after a certain number of retransmissions, an error code may be entered in a memory of the RFID tag and the process continues in one embodiment. In another embodiment, the connected tag identification may be deleted so that a mistake is not made by reading erroneous information by the RFID reader.

If the tag identifications of both the first and second RFID tags were correctly received, an indication of a successful tag identification exchange may be provided to an RFID reader (block 1408). An RFID reader (such as the RFID reader 1330, FIG. 16) can poll either of the first RFID tag or the second RFID tag to monitor whether or not an indication of a successful tag identification exchange has been made. The RFID reader 1330 may read the tag identification of any of the RFID tags and acknowledge successful receipt of any of the tag identifications.

Once a successful tag identification exchange has been made, the tags can operate in any manner for which they are suited. A check is periodically made to see if the tag is still connected (step 1410). If the tag is still connected, the tag may perform typical tag operations (step 1412). This includes, but is not limited to, read and write operations to the RFID reader, as well as receiving and storing data. If the tag is not still connected, then the operation goes back to the start, and attempts to detect a connected tag.

The general protocol for the exchange of tag identifications between two connected RFID tags is described above in FIG. 20. However, the protocol in FIG. 20 is exemplary only and may include additional steps, or the steps may be performed in a different order. For example, in one embodiment, the steps shown in blocks 1400 and 1402 could be performed before the steps shown in blocks 1404 and 1406. In another embodiment, the steps shown in blocks 1404 and 1406 could be performed before the steps shown in blocks 1400 and 1402. The first RFID tag may receive the tag identification from the second RFID tag and send an acknowledgement (blocks 1404 and 1406) before the first RFID tag sends its tag identification to the second RFID tag and receives an acknowledgement from the second RFID tag (blocks 1400 and 1402).

Further, if an acknowledgement is not received in block 1402, then the RFID tag may retransmit any tag identification transmitted with an error (i.e., it has not been acknowledged as received correctly), as discussed in more detail below with respect to FIGS. 21A-21C.

In addition, the sending of the first tag identification from the first RFID tag to the second RFID tag and the receipt of the acknowledgement from the second RFID tag (blocks 1400 and 1402) can occur substantially at the same time as the receiving of the second tag identification from the second RFID tag and the sending of an acknowledgement to the second RFID tag if the communications channel is full duplex. In one embodiment, the communications channel is full duplex if two or more signal lines exist between the connected RFID tags are used, each of the signal lines being unidirectional (as seen below in FIG. 23). For purposes of this embodiment, "substantially at the same time" means that either of the sending of the first tag identification from the first RFID tag to the second RFID tag and the receipt of the acknowledgement from the second RFID tag (blocks 1400 and 1402) may overlap in time with the receiving of the second tag identification from the second RFID tag and/or the sending of an acknowledgement to the second RFID tag.

Figure 21A:
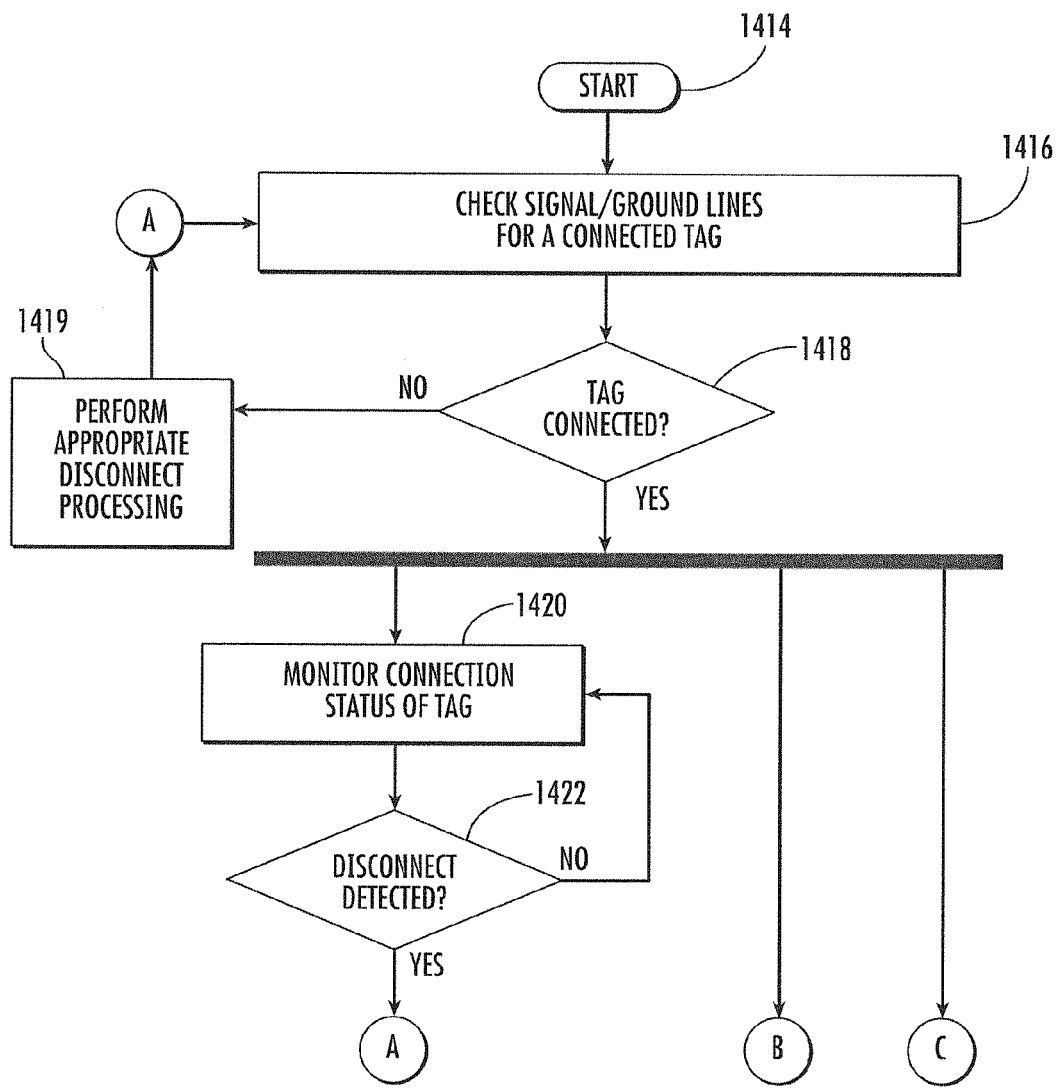
FIGS. 21A-21C comprise a flowchart illustrating an exemplary protocol for communicating between a plurality of connected RFID tags showing various steps of an exemplary protocol in response to different conditions.
Figure 21B:
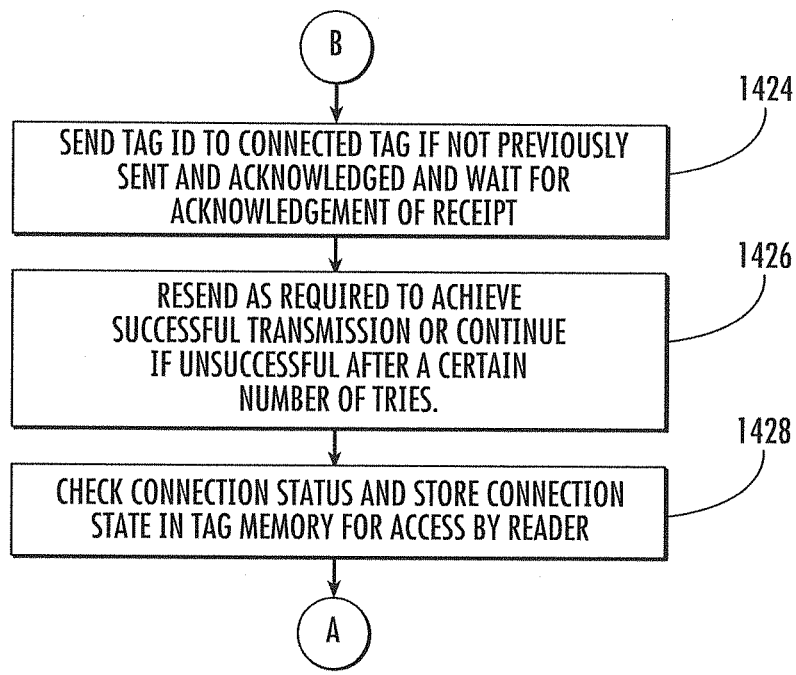
Figure 21C:
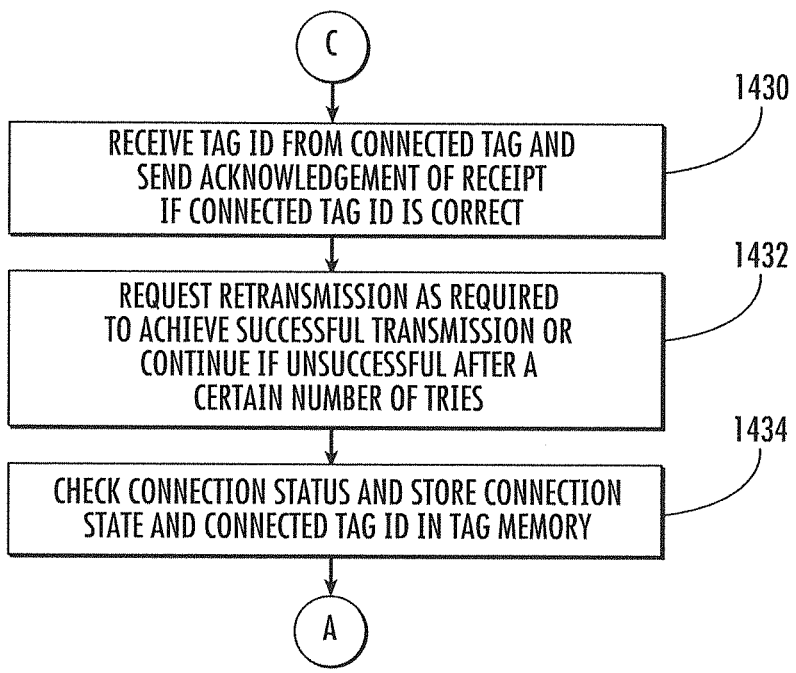

FIGS. 21A-21C comprise a flowchart illustrating an exemplary protocol for communicating between a plurality of connected RFID tags showing various steps of the protocol in response to different conditions. The exemplary protocol of FIGS. 21A-21C is from the perspective of one RFID tag in a set of potentially connected RFID tags. The protocol starts at block 1414. A first RFID tag checks its signal/ground lines to see if there is a connected RFID tag (block 1416). If the first RFID tag is not connected to a second RFID tag (block 1418), then appropriate disconnect processing is performed at block 1419 and the process returns to block 1416 and the signal/ground lines are checked again to see if there is a connected RFID tag. If the first RFID tag is connected to a second RFID tag at block 1418, the first RFID tag performs one or more of three actions depending on the state of various conditions. These three actions may be done concurrently, as indicated by the horizontal black bar in FIG. 21A. The first action, as shown in the left branch, is that the connection status of the tag is monitored (step 1420). If a disconnect is detected between the RFID tags, then at block 1422, the first RFID tag goes back to block 1416 and continues to check its signal/ground lines to see if there is a connected and mated RFID tag. If a disconnect is not detected, the connection status of the tag is periodically monitored for a disconnect.

A second potential concurrent action, as shown by the middle branch B and FIG. 21B, is that the first RFID tag will send its tag identification to the second mated RFID tag if the tag identification has not been previously sent to the second mated RFID tag and acknowledged (block 1424). The first RFID tag will then wait for an acknowledgement from the second RFID tag that the tag identification was received by the second RFID tag. As discussed above with respect to FIG. 20, in one embodiment, the tag identification may be sent along with an error detection code. If the error detection code sent in the first message indicates that the tag identification of the first RFID tag was correctly received by the second RFID tag, then the second RFID tag will send an acknowledgement to the first RFID tag that the tag identification was correctly received. If the error detection code sent in the first message indicates that the tag identification of the first RFID tag was not correctly received by the second RFID tag, or if an acknowledgement is not received from the second RFID tag, then the tag identification is resent until a successful transmission of the tag identification is achieved or until a certain number of unsuccessful tries are attempted (block 1426).

The connection status of the RFID tags is checked and a connection state is stored in the RFID tag memory for access by the RFID reader (block 1428). In one embodiment, a state indicating the connection status of the first RFID tag may be stored in a memory (such as memory 1326 or 1328, FIG. 16), where it may be accessed later by the first RFID tag, another RFID tag, or an RFID reader (such as the RFID reader 1330, FIG. 16). Upon storing of the information in tag memory, whether the transmission of the second tag identification from the second RFID tag to the first RFID tag was successful or not, the first RFID tag continues to check its signal/ground lines to see if it is connected to a mated RFID tag other than the second RFID tag.

The third potential concurrent action that may occur in the protocol illustrated in FIGS. 21A-21C, as shown by the right branch C and FIG. 21C, is that the first RFID tag may receive a second tag identification from the second RFID tag to which the first RFID tag is connected (block 1430). Upon receipt of the second tag identification from the second RFID tag, the first RFID tag will check to see if the second tag identification has been received correctly. This may involve checking an error detection code received along with the second tag identification from the second RFID tag, as discussed above. The first RFID tag will send an acknowledgement of receipt to the second RFID tag if the second tag identification was correctly received (block 1430). The first RFID tag will send a message requesting retransmission of the second tag identification if the second tag identification was not correctly received or to continue if unsuccessful after a certain number of tries (block 1432). The connection status of the RFID tags is checked and a connection state and the connected tag identification is stored in the RFID tag memory for access by the RFID reader (block 1434). In one embodiment, a state indicating the connection status of the first RFID tag, as well as the connected tag identification, may be stored in a memory (such as memory 1326 or 1328, FIG. 16), where it may be accessed later by the first RFID tag, another RFID tag, or an RFID reader (such as the RFID reader 1330, FIG. 16) (block 1434). Upon storing of the information in tag memory, whether the transmission of the second tag identification from the second RFID tag to the first RFID tag was successful or not, the first RFID tag returns to monitor the signal/ground lines to determine if the first RFID tag is still connected to the second RFID tag.

With any of the exemplary protocols illustrated in FIG. 20 and FIGS. 21A-21C, there are a variety of physical mechanisms that can be used to transfer information between connected RFID tags.

Voltage Sensing

One approach for communicating digital signals between mated RFID tags is to generate a voltage signal on the transmitting side and to sense a voltage level on the receiving side. In order to discriminate between a digital "1" or "0" signal level, a unique voltage threshold range is assigned for both a low signal and a high signal. Typically names such as Vih and Vil (Voltage input high and Voltage input low) are used to define the range of input voltages for sensing a "1" and a "0" signal, respectively. Similarly, the names Voh and Vol (Voltage output high and Voltage output low) are used to specify the valid output voltage ranges for a "1" and a "0" signal, respectively. Note that in order to prevent a signal from being misinterpreted when at the boundary between a "1" and a "0" signal, a deadband range is inherently created between Vol max and Voh min in which it is invalid to transmit a signal to ensure that it is interpreted correctly at the receiving end.

Current Mode Sensing

An alternate approach for communicating digital signals between mated RFID tags is current mode sensing. Two concerns with using a voltage sensing mechanism are a) RFID tags operate with low power and low voltages, therefore the deadband range between Vol max and Voh min is necessarily smaller than with, for instance, a 5V Transistor-Transistor Logic (TTL) signal, and b) the RFID operating environment is typically an "electronically noisy" environment in which noise can easily be coupled onto these low power, low voltage signals. This combination of reduced deadband and noisy signal environment makes current sensing a viable alternative. This current sensing approach is very similar to the voltage sensing approach, having similar threshold ranges (Iih→Current input high, Iil→Current input low, Ioh→Current output high, Iol→Current output low) for a "0" vs. a "1" signal. The voltage sensing approach and the current mode sensing approach each has advantages and the appropriate mechanism should be chosen for the specific application conditions such as noise immunity, signal bit rate, power efficiency, and the like.

Separate Communication Lines for Each Tag

In another alternate embodiment, there is a separate physical connection for each of the RFID tags 1312, 1316 (see FIG. 23) to utilize for transmitting its tag identification, thus allowing one or more of the RFID tags 1312 and/or 1316 to continuously (or regularly) transmit its tag identification. This embodiment would allow each of the mated RFID tags 1312, 1316 to continuously listen to the other end of the separate physical connection to see if the particular RFID tag 1312 or 1316 has been connected and what the associated tag identification is. In this approach, the RFID tag may have to operate in an extremely low power environment since the RFID tag must harvest enough power from the RF energy from a nearby RFID reader's transmissions in order to power itself. This low power requirement also necessitates a very small die size. Because of these constraints, it is not desirable to "waste power" by continuously transmitting information that has already been captured by one of the mated RFID tags 1312 and 1316.

Shared Line

Another alternate approach to saving power might be to shrink die size by sharing a common physical connection, such as the common line 1380 in FIG. 18 between the RFID tags 1312, 1316 for both the transmit and receive signals (rather than having a separate line for both transmit and receive). For this embodiment, there would need to be some type of protocol initiation method that the RFID tags 1312, 1316 utilize to initiate the transfer of tag identifications. For instance, the RFID tags 1312, 1316 could wait for a communication from the RFID reader 1330 before sending a request transmission to the other one of RFID tag 1312 or 1316 for it to send its tag identification so that it is ready "just in time" for the request from the RFID reader 1330. This would be a reader directed synchronization method. Another method of protocol initiation is to assign one of the RFID tags as a master and the other as slave in each of the RFID tags 1312, 1316, with this assignment being done at the time of manufacture such that the slave RFID tag always waits for the master RFID tag to initiate the start of the mating tag identification communications. In a system where there is to be communication between one or more RFID tags and/or one or more devices, one or more of the devices may also act as a master that initiates the exchange of information.

Another alternate approach for protocol initiation would be to utilize a random back off time before transmitting along with a collision detection mechanism (similar to the Carrier-Sense Multiple Access/Collision Detection (CSMA/CD) protocol used by Ethernet (IEEE 802.3).

Multiplex

Several of these same techniques could also be utilized for the case where more than two RFID tags are connected together (i.e., three or more RFID tags are connected together). An alternate approach specific to the multi-tag scenario utilizes separate transmit and receive connections in a "token passing" type protocol. In one embodiment, the RFID tags could form a ring where each RFID tag's transmit is connected to the next RFID tag's receive. This approach could utilize the master/slave property to control the protocol initiation. Once the protocol is initiated, the communication works around the ring until it is completed.

Error Checking

Again, because the RFID tags could be operating in a noisy environment utilizing low power communication mechanisms, some type of error checking/correction mechanism may be utilized in these tag-to-tag communications. One exemplary technique is to append a cyclic redundancy check (CRC) or parity bit or bits on the end of the tag identification, combined with a retransmit protocol. If the RFID tags were to be used in a very noisy environment, other well-known error detection and/or correction methods could be employed, such as, but not limited to, forward error correction (FEC) techniques.

There are several fault conditions and cases that must be considered in the tag-to-tag communications. Using error detection (such as the CRC) may handle the case where an RFID tag powers down before completing the tag-to-tag communication since the receiving end will detect an error in the transmission. There are several other subtle fault conditions that need more careful consideration. If an RFID tag is mated and already has communicated its tag identification and then is powered off, it could be possible to disconnect this RFID tag and replace it with another before it is powered up again. Upon power up, to ensure that the disconnect/reconnect event is guaranteed to be detected and handled properly, a maximum power off time allowed before the mating tag identification is considered to be invalid may be specified. If the maximum power off time is reached, the tag identification must be read again. An alternate approach would be to provide a disconnection detection mechanism that immediately invalidates the stored mating tag identification upon detection of a physical disconnection (even under the conditions of no tag power.

Varying power conditions and RF noise will be factors in the reliability of the tag-to-tag communications and the potential need for associated re-transmission. The reliability of the tag-to-tag transfer will naturally increase as the number of bits transferred is reduced (i.e., this reduces the transfer time as well). For some applications with smaller populations of RFID tags, it is not necessary to transfer the total number of bits of the tag identification (which may be up to ninety-six (96) bits in one embodiment). In one embodiment, only a portion of a total number of bits in the first tag identification needs to be sent from the first RFID tag and received by the second RFID tag in order to generate an indication that the first tag identification was correctly received by the second RFID tag.

In one embodiment, the number of bits needed is related to the number of RFID tags that could be seen simultaneously by the RFID reader. Depending on the application, a parameter could be set in each RFID tag (i.e., in a memory of the RFID tag, such as memory 1326 or 1328 in FIG. 16) which controls the number of bits of the tag identification to be transferred. This would provide a configurable mechanism to balance the number of potential RFID tags in the RFID reader's field with the amount of time required to transfer the tag identification (which is directly related to the transfer reliability).

Figure 22:
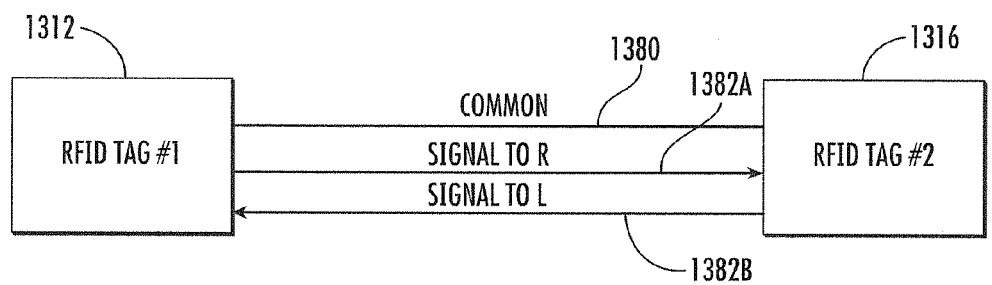
FIG. 22 is an alternate exemplary point-to-point configuration in which a plurality of RFID tags may be connected to each other.

In addition to the basic point-to-point configuration illustrated in FIG. 18, other configurations of two or more mated RFID tags may utilize the protocols disclosed above in FIG. 20 and FIGS. 21A-21C. FIG. 22 shows two RFID tags in an alternative point-to-point configuration. Note that although FIG. 22 is discussed with respect to RFID tag 1312 and RFID tag 1316, the RFID tags 1312 and 1316 could be positioned on a device. In addition, a device that emulates an RFID tag could be used in place of RFID tags 1312 and 1316. In one embodiment, a device 1312 and a device 1316 could be used in the place of RFID tag 1312 and RFID tag 1316 and the two devices can communicate with each other in the same manner as the RFID tag 1312 and the RFID tag 1316 communicate with each other, as described in more detail below.

FIG. 22 is similar to FIG. 18, in that the two RFID tags 1312, 1316 are connected by the common line 1380. The two RFID tags 1312, 1316 may be connected to each other via a variety of means (including but not limited to ohmic, inductive, and capacitive connections). The embodiment of FIG. 22 differs from the embodiment of FIG. 18 in that the RFID tags 1312, 1316 are connected by two signal lines 1382A and 1382B. Each of the signal lines 1382A and 1382B are unidirectional, with the signal line 1382A configured to carry signals left to right from the RFID tag 1312 to the RFID tag 1316, and the signal line 1382B configured to carry signals right to left from the RFID tag 1316 to the RFID tag 1312. A shared bidirectional line may offer economy of hardware (ports, circuit traces, etc.) but may require more sophisticated electronics and protocols. The alternate embodiment having two unidirectional signal lines may utilize simpler electronics, but may use more costly interconnect hardware. In the embodiment of FIG. 22, the RFID tags 1312, 1316 may utilize the protocols disclosed above in FIG. 20 and FIGS. 21A-21C.

FIGS. 23-26 show some representative multiple tag topologies for connecting more than two RFID tags. FIG. 23 is an exemplary chain configuration in which a plurality of RFID tags may be connected to each other. Note that although FIG. 22 is discussed with respect to RFID tag 1312, RFID tag 1316, and RFID tag 1440, one or more of the RFID tags 1312, 1316, and 1440 could be positioned on a device. In addition, a device that emulates an RFID tag could be used in place of RFID tags 1312, 1316 and/or 1440. For example, in one embodiment, a device 1312 and a device 1316 could be used in the place of RFID tag 1312 and RFID tag 1316 and the two devices can communicate with each other in the same manner as the RFID tag 1312 and the RFID tag 1316 communicate with each other, as described in more detail below. In another embodiment, there could be two RFID tags, like RFID tags 1312 and 1316, and a device could be used in the place of RFID tag 1440 such that there are two RFID tags in a point-to-point configuration with a device 1440. This embodiment may be referred to as a "relay" configuration, where information may be communicated, or relayed from RFID tag 1312 to RFID tag 1316 and then communicated, or relayed, from RFID tag 1316 to RFID tag or device 1440.

In the embodiment of FIG. 23, a plurality of n RFID tags are connected to each other in a daisy chain configuration, in which the RFID tag 1312 is connected to the RFID tag 1316 via the common line 1380 and the signal line 1382. RFID tag 1316 is also connected to another RFID tag (not shown) in the chain via a common line 1380-2 and a signal line 1382-2. Any number n of RFID tags may be connected until the last RFID tag in the chain (RFID tag 1440 in the embodiment of FIG. 23) is connected to the previous RFID tag in the chain via a common line 1380-*n* and a signal line 1382-*n*. Each of the signal lines 1382, 1382-2, and 1382-*n* may be a shared bidirectional signal line. However, in alternate embodiments, any or all of the RFID tags in the chain may have two unidirectional signal lines (as shown in FIG. 22) in place of the single bidirectional signal line.

In the embodiment of FIG. 23, each of the RFID tags in the chain may utilize the protocols disclosed above in FIG. 20 and FIGS. 21A-21C to communicate with the RFID tag or tags to which it is connected in the chain. In this manner, data, information, and signals may be communicated from any one of the RFID tags in the chain configuration to any other one of the RFID tags in the chain configuration. For example, in the embodiment of FIG. 23, the RFID tag 1312 may communicate directly with the RFID tag 1316, and the RFID tag 1316 may communicate directly with the next RFID tag in the chain, and so on, until a signal, data, or other information is communicated from the RFID tag 1312 all the way to the RFID tag 1440.

Figure 24:
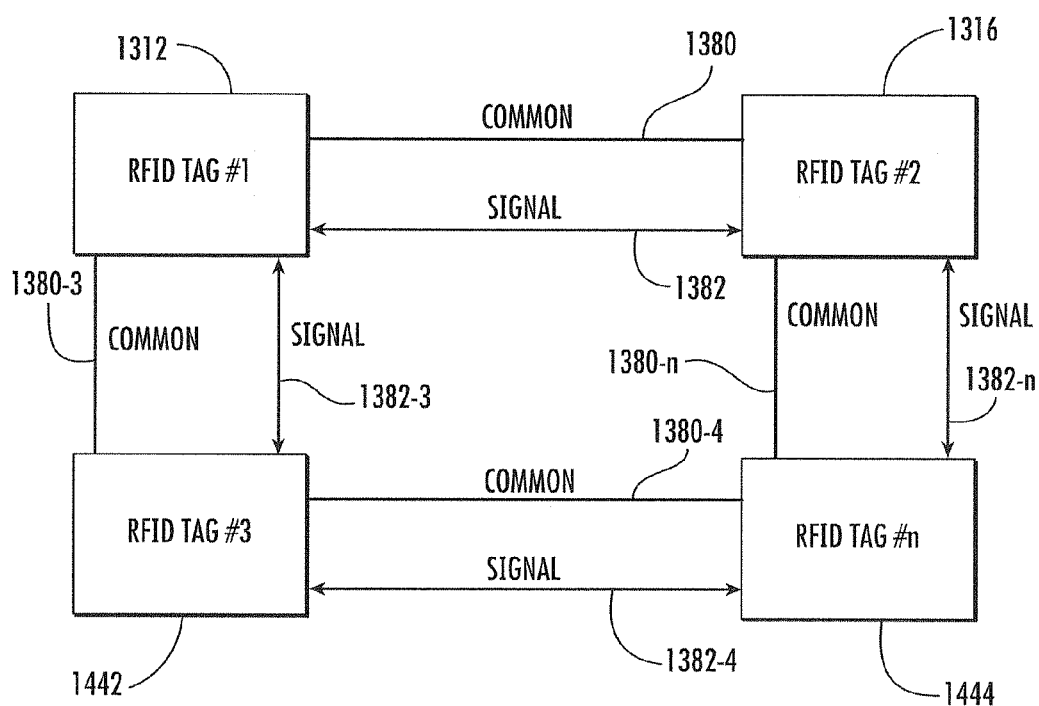
FIG. 24 is an exemplary ring configuration in which a plurality of RFID tags may be connected to each other.

FIG. 24 is an exemplary ring configuration in which a plurality of RFID tags may be connected to each other. Note that although FIG. 24 is discussed with respect to RFID tag 1312, RFID tag 1316, RFID tag 1442, and RFID tag 1444, one or more of the RFID tags 1312, 1316, 1442, and 1444 could be positioned on a device. In addition, a device that emulates an RFID tag could be used in place of RFID tags 1312, 1316, 1442 and/or 1444. For example, in one embodiment, a device 1312 and a device 1316 could be used in the place of RFID tag 1312 and RFID tag 1316 and the two devices can communicate with each other in the same manner as the RFID tag 1312 and the RFID tag 1316 communicate with each other, as described in more detail below. In another embodiment, there could be two RFID tags, like RFID tags 1312 and 1316, and two devices could be used in the place of RFID tags 1442 and 1444 such that there are two RFID tags in a point-to-point configuration with two devices 1442 and 1444. This embodiment may be referred to as a "ring" configuration.

In the embodiment of FIG. 24, a plurality of n RFID tags and/or devices are connected to each other in a ring configuration, in which the RFID tag 1312 is connected to the RFID tag 1316 via the common line 1380 and the signal line 1382. The RFID tag 1312 is also connected to an RFID tag 1442 in the ring via a common line 1380-3 and a signal line 1382-3. The RFID tag 1442 is connected to an RFID tag 1444 in the ring via a common line 80-4 and a signal line 82-4. The RFID tag 16 is connected to the RFID tag 1444 in the ring via a common line 1380-*n* and a signal line 1382-*n*. Although four RFID tags are explicitly shown in FIG. 24, any number n of RFID tags may be connected in the ring. Each of the signal lines 1382, 1382-3, 1382-4, and 1382-*n* may be a shared bidirectional signal line. However, in alternate embodiments, any or all of the RFID tags in the chain may have two unidirectional signal lines (as shown in FIG. 23) in place of the single bidirectional signal line.

In the embodiment of FIG. 24, the RFID tags 1312, 1316, 1442, and 1444 may utilize the protocols disclosed above in FIG. 20 and FIGS. 21A-21C to communicate with any of the other RFID tags in the ring. In this manner, data, information, and signals may be communicated from any one of the RFID tags in the ring configuration to any other one of the RFID tags in the ring. For example, in the embodiment of FIG. 24, the RFID tag 1312 may communicate directly with the RFID tag 1316, and the RFID tag 1316 may communicate directly with the RFID tag 1444. The RFID tag may communicate directly with the RFID tag 1442, which may in turn communicate directly with the RFID tag 1312. In this manner, a signal, data, or other information may be communicated from the RFID tag 1312 to the RFID tag 1444, or vice versa.

Figure 25:
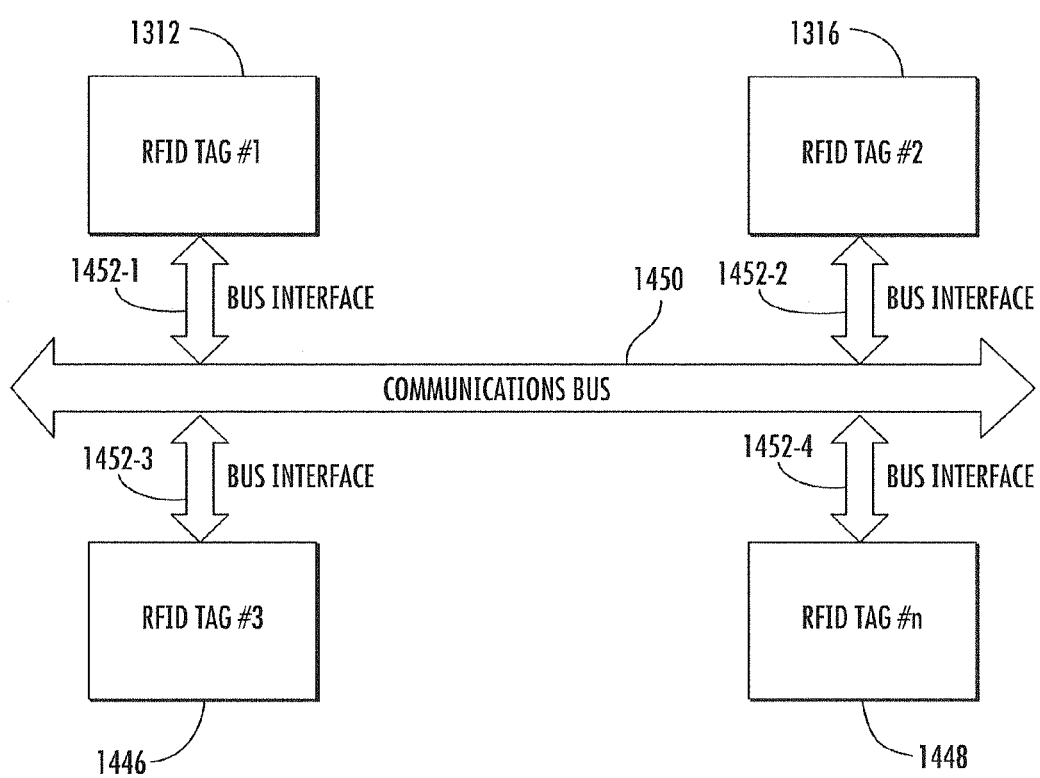
FIG. 25 is an exemplary bus configuration in which a plurality of RFID tags may be connected to each other.

FIG. 25 is an exemplary bus configuration in which a plurality of RFID tags may be connected to each other. In this embodiment, a plurality of n RFID tags are connected to each other in a bus configuration, in which each of the RFID tags are connected to each other via a common communications bus 1450. Thus, in FIG. 25, each of the RFID tags 1312, 1316, 1446, and 1448 are connected to the common communications bus 1450 via their respective bus interfaces 1452-1, 1452-2, 1452-3, and 1452-4. The connection to the communications bus 1450 can use a ground line plus either a single bidirectional signal line or two unidirectional signal lines, to communicate to and from the communications bus 1450. Although four RFID tags are explicitly shown in FIG. 24, any number n of RFID tags may be connected via n number of bus interfaces to the common communications bus 1450.

In the embodiment of FIG. 25, the RFID tags 1312, 1316, 1446, and 1448 may utilize the protocols disclosed above in FIG. 20 and FIGS. 21A-21C to communicate with any of the other RFID tags in the bus configuration. In this manner, data, information, and signals may be communicated from any one of the RFID tags in the bus configuration to any other one of the RFID tags connected to the common communications bus 1450. For example, in the embodiment of FIG. 25, the RFID tag 1312 may communicate a signal, data, or other information via its bus interface 1452-1 to the common communications bus 1450, where it may then be sent simultaneously to any and all of the other RFID tags 1316, 1446, and 1448. In this manner, a signal, data, or other information may be communicated between any of the RFID tags connected to the common communications bus 1450.

Note that although FIG. 25 is discussed with respect to RFID tag 1312, RFID tag 1316, RFID tag 1446, and RFID tag 1448, one or more of the RFID tags 1312, 1316, 1446, and 1448 could be positioned on a device. In addition, a device that emulates an RFID tag could be used in place of RFID tags 1312, 1316, 1446, and 1448.

Figure 26:
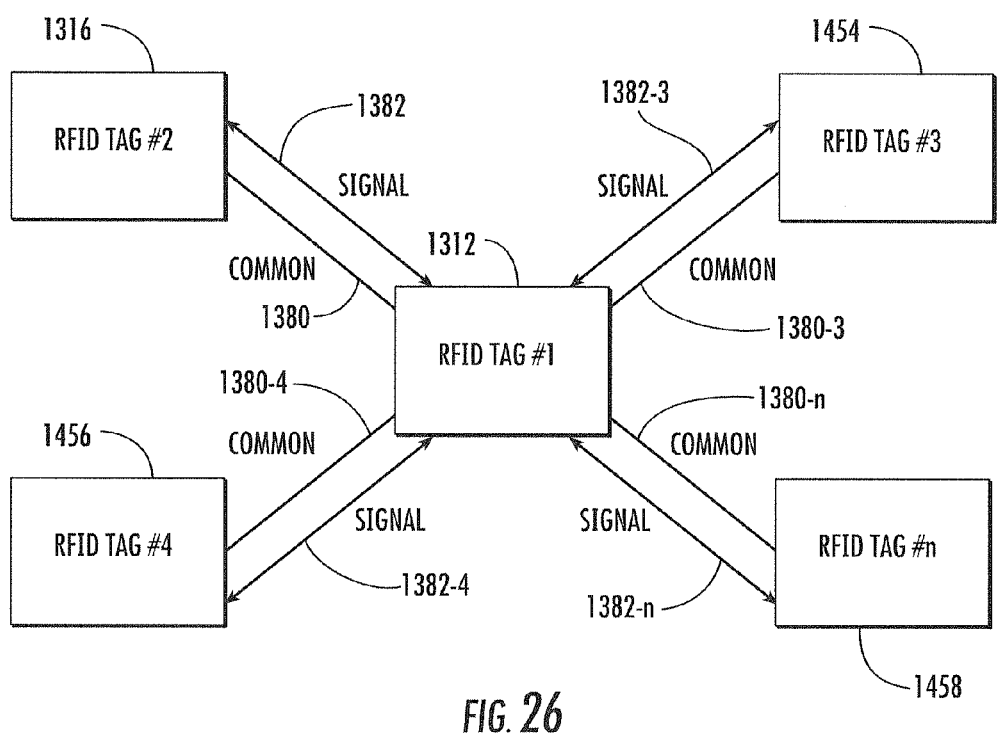
FIG. 26 is an exemplary star configuration in which a plurality of RFID tags may be connected to each other.

FIG. 26 is an exemplary star configuration in which a plurality of RFID tags may be connected to each other. In this embodiment, a plurality of n RFID tags are connected to each other in a star configuration, in which the RFID tag 1312 is connected to each of the other RFID tags in the star configuration. Thus, the RFID tag 1312 is connected to the RFID tag 1316 via the common line 1380 and the signal line 1382. The RFID tag 1312 is also connected to an RFID tag 1454 via a common line 1380-3 and a signal line 1382-3. The RFID tag 1312 is also connected to an RFID tag 1456 via a common line 1380-4 and a signal line 1382-4. The RFID tag 1312 is also connected to an RFID tag 1458 via a common line 1380-n and a signal line 1382-n. Although five RFID tags are explicitly shown in FIG. 26, any number n of RFID tags may be connected to the central RFID tag 1312 in the star configuration. Each of the signal lines 1382, 1382-3, 1382-4, and 1382-n may be a shared bidirectional signal line. However, in alternate embodiments, any or all of the RFID tags in the chain may have two unidirectional signal lines (as shown in FIG. 22) in place of the single bidirectional signal line.

In the embodiment of FIG. 26, the RFID tags 1312, 1316, 1454, 1456, and 1458 may utilize the protocols disclosed above in FIG. 20 and FIGS. 21A-21C to communicate with any of the other RFID tags in the star configuration. In this manner, data, information, and signals may be communicated from any one of the RFID tags in the star configuration to any other one of the RFID tags in the star configuration. For example, in the embodiment of FIG. 26, the RFID tag 1312 may communicate directly with each of the other RFID tags 1316, 1454, 1456, and 1458. For example, the RFID tag 1316 may communicate a signal, data, or other information to the RFID tag 1312 via the signal line 1382, where it may then be sent to any of the other RFID tags 1454, 1456, and 1458 via the respective signal lines 1382-3, 1382-4, and 1382-n. In this manner, a signal, data, or other information may be communicated between any of the RFID tags in the star configuration.

Note that although FIG. 25 is discussed with respect to RFID tag 1312, RFID tag 1316, RFID tag 1454, RFID tag 1456, and RFID tag 1458, one or more of the RFID tags 1312, 1316, 1454, 1456, and 1458 could be positioned on a device. In addition, a device that emulates an RFID tag could be used in place of RFID tags 1312, 1316, 1454, 1456, and 1448.

By employing the disclosed protocols and related systems and methods, RFID tag-to-tag connectivity can be determined without the need to burden the RFID reader with extensive communication between two or more RFID tags. Once the connectivity of two or more mated RFID tags is established, the two or more mated RFID tags can communicate with each other using direct connections between the RFID tags. In this manner, the two or more mated RFID tags may send a signal, data, or other information between connected RFID tags.

Any functionalities disclosed in any embodiments may be incorporated or provided in any other embodiments with suitable circuitry and/or devices. Although the illustrated embodiments are directed to components, wherein RFID-enabled versions of the components, including ICs and IC chips, employ passive RFID tags, further embodiments include one or more semi-passive or active RFID tags depending upon the particular functionality of the RFID tag system desired.

Although the embodiments described herein are directed to RFID tags for communications, the embodiments are applicable to any type of component. Examples include fiber optic connectors and adapters or copper connectors and adapters and other fiber optic and/or copper components. Embodiments disclosed herein can be used in non-telecommunications equipment, particularly regarding components that interconnect and/or are exposed to various conditions for which it is desirable to know the location, connectivity, and/or conditions of the components. The technology described herein is applicable to any two items that need to be mated with each other in a known way, such as electrical connectors, medical devices, fluid couplings, beverage dispensing containers, industrial controls, environmental monitoring devices, connection of consumer electronics, electronics assemblies and subassemblies, containers and lids, doors and doorframes, windows and sills, and many other applications. The terms "plug" and "socket" are generally used herein to define portions of components that are adapted for connecting to one another, such as a connector that is received by an adapter, and are not necessarily limited to standard plugs and sockets.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A system of communicating between one or more radio frequency identification (RFID) tags and/or devices comprising:
    a first RFID tag;
    a second RFID tag; and
    a device, wherein the device does not have native radio frequency communications capabilities,
    wherein the first and second RFID tags are configured to physically mate electrically to each other and directly exchange information, wherein the first and second RFID tags are configured to physically mate electrically to each other via a direct contact between a first electrical lead of the first RFID tag and a second electrical lead of the second RFID tag, and
    wherein the second RFID tag is further configured to physically connect to the device and directly exchange information with the device via the physical connection such that information received directly at the second RFID tag from the first RFID tag may then be directly exchanged with the device.

2. The system of claim 1, wherein the first RFID tag is further configured to send a first message comprising a first tag identification directly from the first RFID tag to the second RFID tag.

3. The system of claim 2, wherein the first RFID tag is further configured to receive a first acknowledgement from the second RFID tag if the first tag identification was correctly received by the second RFID tag.

4. The system of claim 2 further comprising one or more capacitors communicatively coupled to one of the first and second RFID tags and configured to store excess energy received through one or more antennas for providing power to one of the first and second RFID tags.

5. The system of claim 1, wherein the second RFID tag is further configured to send a second message comprising a second tag identification directly from the second RFID tag to the first RFID tag.

6. The system of claim 5, wherein the second RFID tag is further configured to receive a second acknowledgement from the first RFID tag if the second tag identification was correctly received by the first RFID tag.

7. The system of claim 1, wherein the second RFID tag is further configured to send a message comprising the information directly from the second RFID tag to the device.

8. The system of claim 7, wherein the second RFID tag is further configured to receive an acknowledgement from the device if the information was correctly received by the device.

9. The system of claim 1, wherein the first and second RFID tags and the device are further configured to directly exchange information using a common protocol.

10. The system of claim 1 wherein the first and second RFID tags and the device are further configured to directly exchange information without control from an RFID reader.

11. The system of claim 1, wherein the first and second RFID tags and the device are connected in a point-to-point configuration.

12. The system of claim 1, wherein one of the first and second RFID tags is a master tag that initiates the exchange of information.

13. The system of claim 12, wherein the first RFID tag is further configured to directly send information over a first unidirectional signal line to the second RFID tag and the second RFID tag is further configured to directly send information over a second unidirectional signal line to the first RFID tag.

14. The system of claim 1, wherein the device is a master that initiates the exchange of information.

15. The system of claim 1, wherein the information is identification information.

16. The system of claim 1, wherein the information exchanged between the first and second RFID tags and the device comprises one or more of sensor data, status data, device information, device type, device serial number, component performance data, memory contents, and/or register contents.

17. The system of claim 1, wherein the first and second RFID tags are further configured to directly exchange information over a signal line that is shared between the first and second RFID tags.

18. The system of claim 1, wherein the second RFID tag and the device are further configured to directly exchange information over a signal line that is shared between the second RFID tag and the device.

19. The system of claim 1, wherein the second RFID tag is further configured to directly send information over a first unidirectional signal line to the device and the device is further configured to directly send information over a second unidirectional signal line to the second RFID tag.

20. The system of claim 1, wherein the first and second RFID tags are connected via an ohmic connection.

21. The system of claim 1, wherein the second RFID tag and the device are connected via one or more of a group of connections comprising an ohmic connection, a capacitive connection, and an inductive connection.

22. The system of claim 1, wherein the first and second RFID tags and the device are connected in a chain configuration.

23. The system of claim 1, wherein the first and second RFID tags and the device are connected in a ring configuration.

24. The system of claim 1, wherein the first and second RFID tags and the device are connected in a bus configuration comprising a communications bus.

25. The system of claim 1, wherein the first and second RFID tags and the device are connected in a star configuration.

26. The system of claim 1, wherein at least one of the first RFID tag and the second RFID tag is a passive RFID tag.

27. The system of claim 1, wherein the first and second RFID tags are configured to also physically connect to each other in a non-electrical manner.

28. The system of claim 1, wherein the second RFID tag is positioned on the device.

29. A method of communicating between one or more radio frequency identification (RFID) tags and/or devices comprising:
    providing a first RFID tag;
    providing a second RFID tag, wherein the first and second RFID tags are configured to physically mate electrically to each other and directly exchange information, wherein the first and second RFID tags are configured to physically mate electrically to each other via a direct contact between a first electrical lead of the first RFID tag and a second electrical lead of the second RFID tag and wherein the second RFID tag is further configured to physically connect to a device that does not have native radio frequency communications capabilities;

directly receiving information at the second RFID tag from the first RFID tag; and directly exchanging information between the second RFID tag and the device via the physical connection, the information directly exchanged between the second RFID tag and the device comprising the information received at the second RFID tag from the first RFID tag.

30. The method of claim 29, wherein the first and second RFID tags are also configured to physically connect to each other in a non-electrical manner.

31. The method of claim 29, wherein the second RFID tag is positioned on the device.

* * * * *